(12) United States Patent
Moon et al.

(10) Patent No.: US 10,530,571 B2
(45) Date of Patent: Jan. 7, 2020

(54) SECURE COMMUNICATION METHOD AND APPARATUS AND MULTIMEDIA DEVICE EMPLOYING THE SAME

(71) Applicant: SAMSUNG ELECTRONICS CO., LTD., Suwon-si (KR)

(72) Inventors: Han-gil Moon, Daejeon (KR); Hyun-wook Kim, Suwon-si (KR); Seon-ho Hwang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 64 days.

(21) Appl. No.: 15/104,629

(22) PCT Filed: Dec. 15, 2014

(86) PCT No.: PCT/KR2014/012365
§ 371 (c)(1),
(2) Date: Jun. 15, 2016

(87) PCT Pub. No.: WO2015/088296
PCT Pub. Date: Jun. 18, 2015

(65) Prior Publication Data
US 2016/0315762 A1 Oct. 27, 2016

Related U.S. Application Data

(60) Provisional application No. 61/916,238, filed on Dec. 15, 2013.

(30) Foreign Application Priority Data

Jan. 15, 2014 (KR) .................. 10-2014-0005328

(51) Int. Cl.
*H04L 9/06* (2006.01)
*H04W 12/00* (2009.01)
(Continued)

(52) U.S. Cl.
CPC ............ *H04L 9/065* (2013.01); *H04L 9/0819* (2013.01); *H04L 63/0457* (2013.01); *H04L 63/061* (2013.01); *H04W 12/0013* (2019.01)

(58) Field of Classification Search
CPC ....................................................... H04L 9/065
See application file for complete search history.

(56) References Cited

U.S. PATENT DOCUMENTS

| 5,592,556 A | 1/1997 | Schwed |
| 6,118,775 A | 9/2000 | Kari et al. |
(Continued)

FOREIGN PATENT DOCUMENTS

| JP | 2006-352895 A | 12/2006 |
| JP | 2007-311842 A | 11/2007 |
(Continued)

OTHER PUBLICATIONS

Communication dated Jul. 3, 2017, from the European Patent Office in counterpart European Application No. 14870633.6.
(Continued)

*Primary Examiner* — Simon P Kanaan
(74) *Attorney, Agent, or Firm* — Sughrue Mion, PLLC

(57) ABSTRACT

A secure communication apparatus may include a security module for generating an encrypted bitstream by encrypting at least a portion of data forming a bitstream and inserting at least a portion of key information used in the encryption into the bitstream and for decrypting encrypted data by acquiring at least a portion of key information for the decryption from a received encrypted bitstream, and a communication module for transmitting and receiving the encrypted bitstream.

19 Claims, 15 Drawing Sheets

(51) Int. Cl.
*H04L 9/08* (2006.01)
*H04L 29/06* (2006.01)

(56) References Cited

U.S. PATENT DOCUMENTS

| | | | | |
|---|---|---|---|---|
| 6,684,289 | B1* | 1/2004 | Gonzalez | G06F 12/0246 |
| | | | | 711/103 |
| 7,643,817 | B2 | 1/2010 | Klug et al. | |
| 7,747,021 | B2 | 6/2010 | Lindteigen et al. | |
| 7,958,376 | B2* | 6/2011 | Glen | G06F 21/602 |
| | | | | 711/100 |
| 8,503,621 | B2 | 8/2013 | Patel et al. | |
| 8,555,058 | B2 | 10/2013 | Choi et al. | |
| 9,530,021 | B2* | 12/2016 | Otsuka | G06F 21/74 |
| 2003/0003896 | A1* | 1/2003 | Klingler | H04L 9/12 |
| | | | | 455/411 |
| 2004/0081333 | A1 | 4/2004 | Grab et al. | |
| 2005/0254645 | A1* | 11/2005 | Shippy | G06F 21/606 |
| | | | | 380/28 |
| 2006/0269065 | A1 | 11/2006 | Lindteigen et al. | |
| 2008/0267403 | A1 | 10/2008 | Boult | |
| 2010/0142707 | A1* | 6/2010 | Han | H04L 63/0428 |
| | | | | 380/255 |
| 2011/0135090 | A1 | 6/2011 | Chan et al. | |
| 2012/0140925 | A1 | 6/2012 | Bekiares et al. | |
| 2016/0218867 | A1* | 7/2016 | Nordholt | H04L 9/0852 |

FOREIGN PATENT DOCUMENTS

| | | |
|---|---|---|
| KR | 10-2007-0122560 A | 12/2007 |
| KR | 10-0978987 B1 | 8/2010 |

OTHER PUBLICATIONS

V. Senk, et al., "A New Speech Scrambling Concept Based on Hadamard Matrices", IEEE Signal Processing Letters, vol. 4, No. 6, Jun. 1997, pp. 161-163.

S. Sridharan, et al., "Fast Fourier transform based speech encryption system", IEE Proceedings—I, vol. 138, No. 3, Jun. 1991, pp. 215-223.

Yuan Wu, et al., "Speech Scrambling with Hadamard Transform in Frequency Domain", ICSP'02 Proceedings, 0-7803-7488-6/02, 2002 IEEE, pp. 1560-1563.

International Search Report for PCT/KR2014/012365 dated Mar. 18, 2015 [PCT/ISA/210].

Written Opinion for PCT/KR2014/012365 dated Mar. 18, 2015 [PCT/ISA/237].

Communication dated Oct. 9, 2018, from the State Intellectual Property Office of People's Republic of China in counterpart Application No. 201480075556.5.

* cited by examiner

SECURE COMMUNICATION METHOD AND APPARATUS AND MULTIMEDIA DEVICE EMPLOYING THE SAME

CROSS-REFERENCE TO RELATED APPLICATION

This is a National Stage Entry of International Application No. PCT/KR2014/012365 filed Dec. 15, 2014, claiming priority based on U.S. Provisional Application No. 61/916,238 filed Dec. 15, 2013 and Korean Patent Application No. 10-2014-0005328 filed Jan. 15, 2014, the contents of all of which are incorporated herein by reference in their entirety.

TECHNICAL FIELD

One or more exemplary embodiments relate to a secure communication method and apparatus and a multimedia device employing the same.

BACKGROUND ART

Along with the popularization of smartphones and the like, the use of wideband code division multiple access (WCDMA) 3G and long term evolution (LTE) 4G communication has rapidly increased. General users tend to have a sense of unease about security and privacy. Recently, due to social issues such as communication eavesdropping or monitoring, the sense of unease is getting worse, and demands of users about safe communication are increasing. Accordingly, a secure communication related market has significantly grown in not only the public sector but also the private sector.

However, for existing security related products and services, since a separate server for distributing or managing a key used for encryption is prepared, user information remains in the server, and thus, a risk of an outflow due to a request from a public or private organization still exists, and accordingly, a user still feels unease due to this risk. Therefore, for secure communication, the necessity for using no server, minimizing user information to be recorded in a server if the server is used, or restricting an access right to user information is raised.

In addition, when inter-terminal secure communication is performed, an entire call packet is encrypted and transmitted/received, and thus it is difficult to compatibly use existing communication networks or existing codec algorithms. Accordingly, the necessity for inter-terminal secure communication having an encryption algorithm therein while maintaining compatibility with the existing communication networks or the existing codec algorithms is also raised.

DISCLOSURE

Technical Problems

One or more exemplary embodiments include a secure communication method and apparatus for encrypting a payload region of a bitstream, inserting key information used in the encryption into an auxiliary region of the bitstream, and transmitting the bitstream and a multimedia device employing the same.

One or more exemplary embodiments include a secure communication method and apparatus for encrypting a payload region of a bitstream, inserting key information used in the encryption into the payload region of the bitstream, and transmitting the bitstream and a multimedia device employing the same.

One or more exemplary embodiments include an inter-channel secure communication method and apparatus with an embedded encryption algorithm while maintaining compatibility with the existing communication networks and a multimedia device employing the same.

One or more exemplary embodiments include a secure communication method and apparatus for transmitting a packet including a bitstream and a packet including key information for encryption of the bitstream through a same communication channel and a multimedia device employing the same.

One or more exemplary embodiments include a secure communication method and apparatus for transmitting a packet including a bitstream and a packet including key information for encryption of the bitstream through different communication channels and a multimedia device employing the same.

One or more exemplary embodiments include a secure communication method and apparatus for distributing and transmitting key information used for multi-encryption of a bitstream through different communication channels and a multimedia device employing the same.

Technical Solution

According to one or more exemplary embodiments, a secure communication apparatus includes: a security module for generating an encrypted bitstream by encrypting at least a portion of data forming a bitstream and inserting at least a portion of key information used in the encryption into the bitstream and for decrypting encrypted data by obtaining at least a portion of key information for the decryption from a received encrypted bitstream; and a communication module for transmitting and receiving the encrypted bitstream.

The security module may encrypt a payload region of the bitstream.

The security module may insert the key information into an auxiliary region of the bitstream.

The security module may insert the key information into the payload region of the bitstream.

The security module may perform the encryption during encoding or after completing the encoding.

The key information may include key data, an index of the key data, or a pointer value of the key data.

The key data may be fragmented and included in the bitstream together with fragmentation information of the key data.

The encrypted bitstream may further include a synchronization bit indicating whether encryption has been performed.

The security module may decrypt a predetermined number of frames if the synchronization bit is detected.

The encrypted bitstream may further include an encryption start bit and an encryption end bit indicating a region in which encryption has been performed.

If the portion of key information is included in the encrypted bitstream, the remaining key information may be transmitted through a second packet that is different from a first packet related to the encrypted bitstream.

The second packet may be transmitted and received through the same communication network as that through which the first packet is transmitted and received.

The second packet may be transmitted and received through a different communication network from that through which the first packet is transmitted and received.

In a normal mode, the security module may generate a bitstream through encoding and decode a bitstream, and the communication module may transmit and receive the bitstream.

According to one or more exemplary embodiments, a secure communication method includes: generating, by a first terminal, an encrypted bitstream by encrypting at least a portion of data forming a bitstream and inserting at least a portion of key information used in the encryption into the bitstream, and transmitting the encrypted bitstream from the first terminal to a second terminal; and if a bitstream received from the second terminal is encrypted, decrypting, by the first terminal, encrypted data by acquiring at least a portion of key information for the decryption from the bitstream.

According to one or more exemplary embodiments, a secure communication method includes: transmitting a first encryption key from a first terminal to a second terminal and transmitting a second encryption key from the second terminal to the first terminal; encrypting, by the first terminal, at least a partial region of a first bitstream by using the second encryption key and encrypting, by the second terminal, at least a partial region of a second bitstream by using the first encryption key; and decrypting, by the first terminal, the second bitstream including an encrypted region, which is provided from the second terminal, by using the first encryption key and decrypting, by the second terminal, the first bitstream including an encrypted region, which is provided from the first terminal, by using the second encryption key.

According to one or more exemplary embodiments, a multimedia device having a secure communication function includes: a communication unit; and a processor for generating an encrypted bitstream by encrypting at least a portion of data forming a bitstream and inserting at least a portion of key information used in the encryption into the bitstream and for decrypting encrypted data by obtaining at least a portion of key information for the decryption from a received encrypted bitstream, if a security mode is set.

Advantageous Effects

According to one exemplary embodiment, by encrypting at least a portion of a media bitstream, e.g., a payload region, inserting key information used for the encryption into an auxiliary region of the media bitstream, and transmitting the media bitstream, it is not necessary that key information is shared in advance between terminals, and thus, secure communication may be performed between terminals having a same encryption algorithm by using the existing communication networks and the existing codec algorithms as they are even without a server for key distribution or management.

According to another exemplary embodiment, by encrypting at least a portion of a media bitstream, e.g., a payload region, inserting key information used for the encryption into the payload region of the media bitstream, and transmitting the media bitstream, key loss may be prevented even though a transmission terminal and a reception terminal use different codec algorithms, and thus, stable secure communication may be performed.

According to another exemplary embodiment, between terminals to which a security mode is set, by transmitting an encryption key for encrypting a bitstream generated by a counterpart terminal through a first region of the bitstream and decrypting a received bitstream including a second region on which encryption is performed, by using the encryption key transmitted to the counterpart terminal, secure communication may be performed while maintaining compatibility with the existing codec algorithms.

According to another exemplary embodiment, by transmitting key information for secure communication by using a separate packet except for a packet related to a media bitstream through a same communication channel between transmission and reception terminals having a same encryption algorithm therein, the key information for secure communication may be generated without limiting a bit size, and thus security may be increased.

According to another exemplary embodiment, by transmitting a key packet from a transmission terminal having a same encryption algorithm therein to a reception terminal through a different communication channel from that for a packet related to a media bitstream, highly secured key information may be generated without limiting a bit size, or a highly secured channel may be used as a key packet transmission channel.

According to another exemplary embodiment, when at least a portion of a media bitstream, e.g., a payload region, is encrypted by means of a first key, and the first key is encrypted by means of a second key, by inserting the encrypted first key into the media bitstream and transmitting the second key through a different communication channel from that for a packet related to the media bitstream, security may be increased through dual encryption and key distribution/transmission.

MODE FOR INVENTION

Figure 1A:
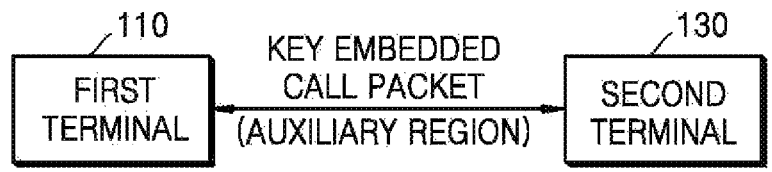
FIGS. 1A to 1C illustrate diagrams for describing the concept of a secure communication method according to an exemplary embodiment of the inventive concept.

The inventive concept may allow various kinds of change or modification and various changes in form, and specific embodiments will be illustrated in drawings and described in detail in the specification. However, it should be understood that the specific embodiments do not limit the inventive concept to a specific disclosing form but include every modified, equivalent, or replaced one within the spirit and technical scope of the inventive concept. In the following description, when it is determined that a specific description of relevant well-known techniques may obscure the main point, a detailed description thereof is omitted. However, it may be understood by those of ordinary skill in the art that the inventive concept could be carried out even without the specific description. For example, when a communication channel is a 3G or 4G network in the following description, the inventive concept is applicable to another arbitrary communication channel except for the unique features of the 3G or 4G network.

Although terms, such as 'first' and 'second', can be used to describe various elements, the elements cannot be limited by the terms. The terms can be used to classify a certain element from another element.

The terminology used in the application is used only to describe specific embodiments and does not have any intention to limit the inventive concept. An expression in the singular includes an expression in the plural unless they are clearly different from each other in context. In the application, it should be understood that terms, such as 'include' and 'have', are used to indicate the existence of an implemented feature, number, step, operation, element, part, or a combination thereof without excluding in advance the possibility of the existence or addition of one or more other features, numbers, steps, operations, elements, parts, or combinations thereof.

In the following embodiments, the term, such as "module" or " . . . unit," indicates a unit for processing at least one function or operation, and this may be implemented by hardware, software, or a combination thereof. In addition, a plurality of "modules" or " . . . units" may be integrated as at least one module and implemented as at least one processor except for a "module" or " . . . unit" needed to be implemented as specific hardware.

In the following embodiments, it is assumed that a terminal is an alias for a user equipment (UE), a mobile station (MS), an advanced mobile station (AMS), a device, a multimedia device, or a mobile or fixed user-end device or equipment for a vehicle or the like. In addition, it is assumed that a base station is an alias for an arbitrary node of a network end or a communication network server, which communicates with the terminal, such as a Node B, an eNode B, an access point (AP), or the like.

In the following embodiments, a terminal may manually or automatically support another communication mode while supporting one communication mode. In addition, the terminal may manually or automatically support a plurality of other communication scheme services while supporting one communication mode. In addition, the terminal may simultaneously transmit and receive data in one or more communication modes.

In the following embodiments, information may be replaced with a parameter, a value or data etc.

The inventive concept will now be described more fully with reference to the accompanying drawings, in which exemplary embodiments of the inventive concept are shown. Like reference numerals in the drawings denote like elements, and thus their repetitive description will be omitted. For convenience of description, processes which must be performed in advance between a terminal and a base station for cellular communication, e.g., authentication for a network access and the like, are omitted, and encryption/decryption in a terminal and a relationship between terminals for transmitting and receiving a signal, data, or a packet will be mainly described.

Figure 1B:
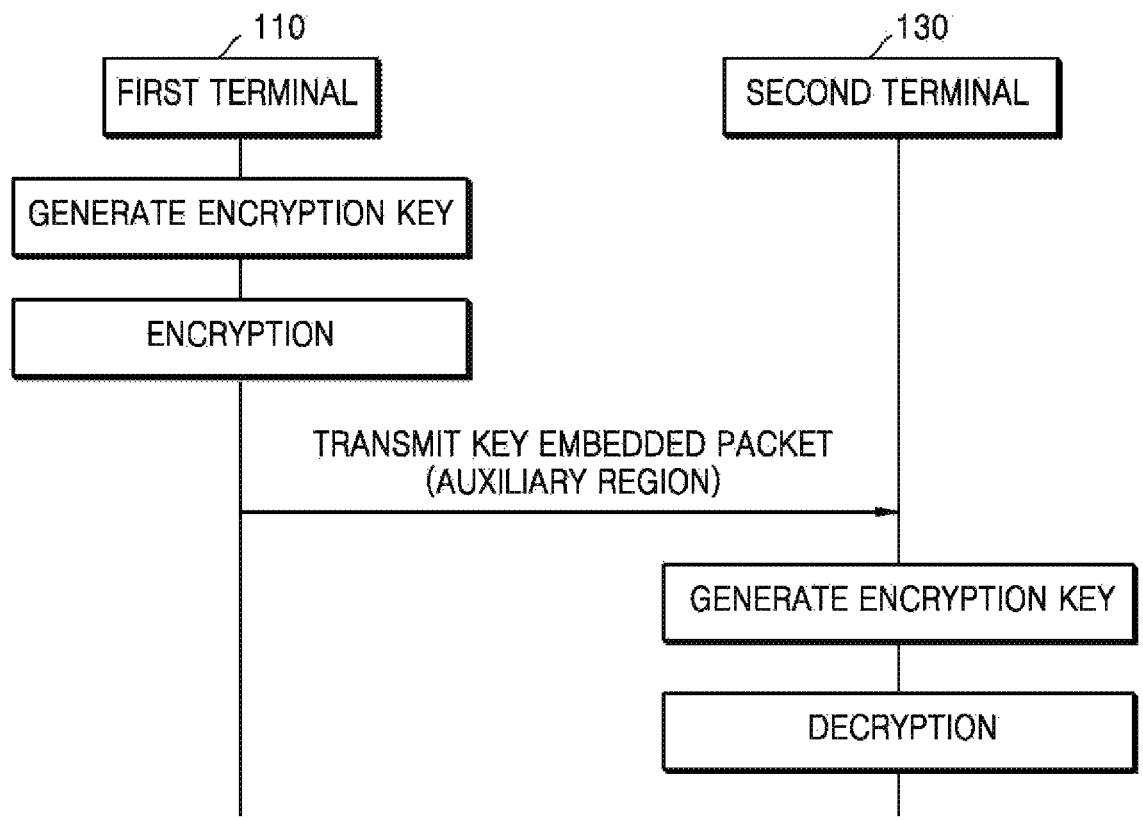
Figure 1C:
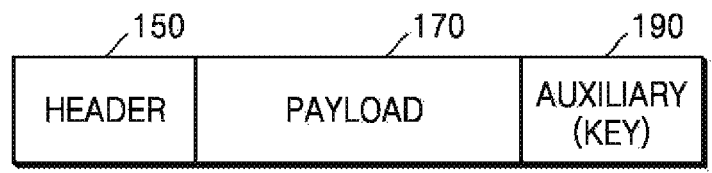

FIGS. 1A to 1C illustrate diagrams for describing the concept of a secure communication method according to an exemplary embodiment of the inventive concept.

According to the secure communication method illustrated in FIGS. 1A and 1B, when a secure communication mode (hereinafter, referred to as "security mode") is set between a first terminal 110 at a transmission side and a second terminal 130 at a reception side, the first terminal 110 may generate key information and encrypts at least a portion of data forming a bitstream. The first terminal 110 may embed encryption information including an encryption key into the bitstream, generate a key-embedded call packet, and transmit the key-embedded call packet to the second terminal 130 at the reception side through a communication channel. According to an exemplary embodiment, the encryption information may be included in an auxiliary region of the bitstream. The second terminal 130 may receive the key-embedded call packet, generate key information, and perform decryption by using the key information. The first and second terminals 110 and 130 may be arbitrary multimedia terminals equipped with a wired or wireless communication function. Herein, the key information included in the encrypted bitstream or acquired from the encrypted bitstream may be an entire encryption key or a partial encryption key. The bitstream may be generated by encoding a speech signal by a codec algorithm.

According to another embodiment, when the security mode is set between the first terminal 110 at a transmission side and the second terminal 130 at a reception side, the first terminal 110 and the second terminal 130 may transmit and receive a key to be used for encryption in a counterpart terminal, perform encryption by using the received key, and decrypt a received encrypted bitstream by using the key transmitted to a counterpart terminal.

In detail, the first terminal 110 may generate a key to be used for encryption in the second terminal 130 and transmit the generated key to the second terminal 130, or receive a key to be used for encryption in the first terminal 110 from the second terminal 130. Thereafter, the first terminal 110 may encrypt at least a partial region of a first bitstream by using the key received from the second terminal 130 and transmit the first bitstream including the encrypted region to the second terminal 130. Meanwhile, the first terminal 110 may decrypt a second bitstream including an encrypted region, which is received from the second terminal 130, by using the key which has been transmitted to the second terminal 130. Herein, the key may be embedded in a predetermined region, e.g., in an auxiliary region, of a bitstream and transmitted and received. The encrypted region in the first or second bitstream may be the same region as the region in which the key is embedded or be different from the region in which the key is embedded, e.g., a payload region.

A description is made as below based on a signal flow between the first terminal 110 and the second terminal 130.

After the security mode is set, the first terminal 110 may generate a key to be used for encryption in the second terminal 130, embed the generated key in a predetermined region, e.g., an auxiliary region, of a bitstream, transmit the bitstream in which the key is embedded to the second terminal 130, and extract a key embedded in a predetermined region, e.g., an auxiliary region, from a bitstream transmitted from the second terminal 130. The first terminal 110 may encrypt a predetermined region, e.g., a payload region, of a bitstream by using the extracted key and transmit the bitstream including the encrypted payload region to the second terminal 130. Thereafter, the first terminal 110 may decrypt a bitstream including an encrypted region, which is received from the second terminal 130, by using the key which has been transmitted to the second terminal 130.

Likewise, after the security mode is set, the second terminal 130 may generate a key to be used for encryption in the first terminal 110, embed the generated key in a predetermined region, e.g., an auxiliary region, of a bitstream, transmit the bitstream in which the key is embedded to the first terminal 110, and extract a key embedded in a predetermined region, e.g., an auxiliary region, from a bitstream transmitted from the first terminal 110. The second terminal 130 may encrypt a predetermined region, e.g., a payload region, of a bitstream by using the extracted key and transmit the bitstream including the encrypted payload region to the first terminal 110. Thereafter, the second terminal 130 may decrypt a bitstream including an encrypted region, which is received from the first terminal 110, by using the key which has been transmitted to the first terminal 110.

That is, in the first terminal 110 and the second terminal 130, a key is transmitted and received therebetween before encryption starts, and in this case, a key transmitted to a counterpart terminal may be used to decrypt a received bitstream, and a key received from a counterpart terminal may be used to encrypt a generated bitstream. According to another embodiment, only a partial key may be transmitted and received between the first terminal 110 and the second terminal 130, and the partial key may be combined with the rest key shared by each terminal and then be used for encryption and decryption. According to another embodiment, only a partial key may be transmitted and received between the first terminal 110 and the second terminal 130, and the partial key may be combined with the rest key provided from the outside and then be used for encryption and decryption.

FIG. 1C illustrates a structure of a bitstream applied to one or more embodiments, wherein the bitstream may include a header region 150, a payload region 170, and an auxiliary region 190. Meanwhile, a region corresponding to the auxiliary region 190 may be allocated to a specific location of the header region 150 or the payload region 170. The header region 150 may include information related to the payload region 170, the payload region 170 may include a field in which encoded data and a parameter used for the encryption are arranged, and the auxiliary region 190 may include a reserved field for use in the future. An auxiliary region arranged at a specific location of the header region 150 or the payload region 170 may also include a reserved field for use in the future. An arrangement order of each region may be or may not be specified. In addition, each region may be plural in number, and another region may be added to the bitstream or the structure of the bitstream may be changed, according to an updated version of a codec algorithm.

The header region 150 may include at least one of information indicating whether data included in the payload region 170 is video or audio and information indicating a codec algorithm type. According to an exemplary embodiment, at least one of the header region 150 and the payload region 170 may be encrypted, and encryption information including an encryption key may be embedded in the auxiliary region 190.

The first and second terminals 110 and 130 may include a communication modem, e.g., a long term evolution (LTE) modem, a code division multiple access (CDMA) modem, or a wideband CDMA (WCDMA) modem. To implement the secure communication method according to the present exemplary embodiment, decoding by a programmable processor other than the communication modem is needed. To this end, the header region 150 of the bitstream encrypted by the first terminal 110 may include a speech codec algorithm type and an identifier indicating whether decoding is performed in the communication modem. The second terminal 130 may check the identifier included in the header region 150, and according to the checking result, the second terminal 130 may not decode the received encrypted bitstream in the communication modem but decode the received encrypted bitstream in another processor, e.g., an application processor or a digital signal processor (DSP), thereby achieving secure voice communication.

According to the present exemplary embodiment, by transmitting an encryption key of encryption information, which is embedded in an auxiliary region of a bitstream, it is not necessary that the first and second terminals 110 and 130 share the encryption key in advance, and thus secure communication is possible even without a separate server related to key exchange. According to the exemplary embodiment described above, before encryption starts, a key to be used for encryption in a counterpart terminal is transmitted and received directly between the first terminal 110 and the second terminal 130, and thus, secure communication is enabled without a separate server related to key exchange. According to an embodiment, a key used for encryption may be embedded in a bitstream including an encrypted region and transmitted to a counterpart terminal, or a key to be used for encryption may be embedded in a normal bitstream and transmitted to a counterpart terminal.

Figure 2:
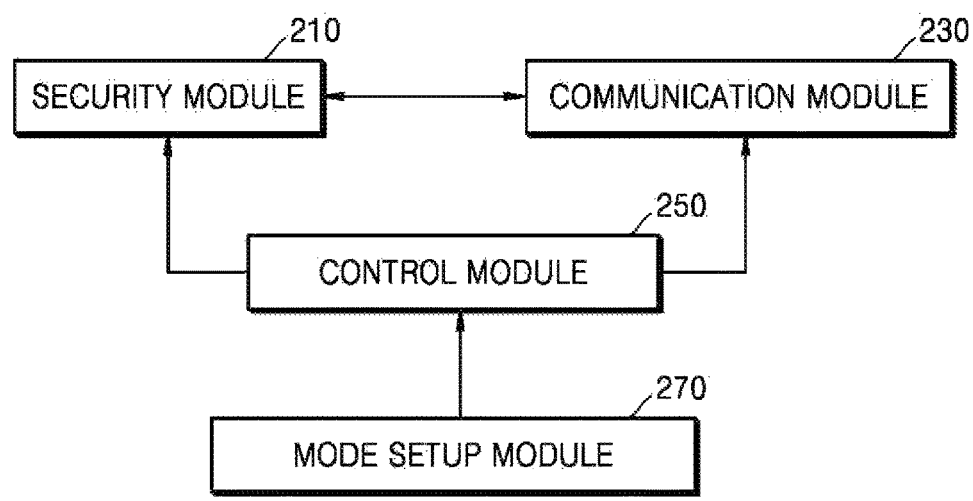
FIG. 2 illustrates a block diagram of a secure communication apparatus according to an exemplary embodiment of the inventive concept.

FIG. 2 illustrates a block diagram of a secure communication apparatus according to an exemplary embodiment of the inventive concept, wherein the secure communication apparatus may be equipped in each of the first and second terminals 110 and 130 of FIG. 1A. The secure communication apparatus will be described for a case where a security module 210 supports both a normal mode and a security mode. When the security module 210 supports only the security mode, a separate processing module supporting the normal mode, e.g., a codec module, may be separately provided. The secure communication apparatus of FIG. 2 may be detachably mounted in a commercial multimedia device, and in this case, the secure communication apparatus may be configured with functions except for those replaceable by functions included in the multimedia device.

The secure communication apparatus may include the security module 210, a communication module 230, a control module 250, and a mode setup module 270. Various functions performed by the control module 250 may be separated and included in other modules, e.g., the security module 210 and the communication module 230. The mode setup module 270 may directly set an operation mode for the security module 210 and the communication module 230. If a user input is not needed in relation to secure communication, the mode setup module 270 may not be provided. Various functions of the mode setup module 270 may be included in the security module 210. The other modules except for the communication module 230 may be configured as a single processor.

Referring to FIG. 2, the security module 210 may generate an encrypted bitstream by encrypting at least a portion of data forming a bitstream and inserting information related to the encryption into the bitstream. If a packet received through the communication module 230 includes an encrypted bitstream, the security module 210 may acquire encryption information from the encrypted bitstream to decrypt the encrypted bitstream. Herein, data included in at least one of a payload region and a header region of the bitstream may be encrypted. The encryption information may include key information related to an encryption key. In addition, the encryption information may further include at least one of a location of an encrypted region and an encryption algorithm type. The encryption key may be key data or an index or a pointer value of the key data. When the encryption key is fragmented and inserted into the bitstream, fragmentation information may be included in the bitstream. The encryption key of the encryption information may be inserted into an auxiliary region of the bitstream.

The security module 210 may generate a bitstream from an input signal without encryption on the input signal and provide the bitstream to the communication module 230, in the normal mode. If a packet received through the communication module 230 does not include an encrypted bitstream, the security module 210 may restore an original signal from a bitstream without decrypting the bitstream.

The security module 210 may generate a bitstream by using a codec algorithm embedded therein, stored in hardware detachable from a device, or downloaded from a network. The security module 210 may process encryption or decryption by using an encryption algorithm embedded therein, stored in hardware detachable from a device, or downloaded from a network. Information related to an encryption key for the security module 210 may be stored in hardware detachable from a device and managed separately from the device. The encryption algorithm may include substitution of data using the encryption key or various operations.

The security module 210 may process the data in at least one operation mode.

The communication module 230 includes at least one antenna and may generate a packet corresponding to a predetermined communication protocol from a bitstream or an encrypted bitstream provided by the security module 210 and transmit the packet in a wired or wireless manner. The communication module 230 may parse a bitstream or an encrypted bitstream from a packet received in a wired or wireless manner and provide the bitstream or the encrypted bitstream to the security module 210. The communication module 230 may generate a media packet, e.g., a separate packet which is not a call packet, for a key which is not inserted into the encrypted bitstream and insert the key into the media packet.

The communication module 230 may operate in one of a plurality of key transmission modes. For example, a packet may be configured with a call packet and a separate key packet according to a transmission mode. As another example, the key packet may be transmitted at the same time as the call packet is transmitted or transmitted prior to the call packet. Herein, the communication channel may correspond to a 2G network, a 3G network, a 4G network, a beyond 4G (B4G) network, a 5G network, a Wi-Fi network, an internet protocol (IP) network, a device-to-device (D2D) direct communication network, or the like or may also correspond to another next generation network or a heterogeneous network. The communication channel may be named as a voice network or a data network or named as a circuit switching network, a packet switching network, or an IP multimedia subsystem (IMS) network.

The control module 250 may generally control an operation of the secure communication apparatus including the security module 210 and the communication module 230. The control module 250 may control the security module 210 or the communication module 230 to operate in an operation mode according to a user setup or to operate a preset operation mode. The control module 250 may control the security module 210 and the communication module 230 in correspondence with whether the security mode between terminals is set or the normal mode is maintained.

The mode setup module 270 may set an operation mode related to secure communication. The mode setup module 270 may include a user interface (UI), a graphic user interface (GUI), or at least one button mounted in a terminal. The operation mode may include at least one of a security mode setup, an encryption strength, and a secure communication target but is not limited thereto.

The security mode may be set by allowing a user to confirm whether the security mode is set before or after a recipient is called. According to an exemplary embodiment, the security mode setup may include a secure communication start or end time point setup. The secure communication start or end time point may be the same as a call start or end time point or may be set even during a call. The primarily set security mode may be automatically released or reset according to network circumstances.

The encryption strength may be set differently for each recipient or each recipient group or may be set differently according to network circumstances and may include a single-encryption mode or a multi-encryption mode, such as a dual-encryption mode or a triple-encryption mode. When a terminal embeds a plurality of encryption algorithms or a plurality of key generation methods therein, the encryption strength may be set differently for each encryption algorithm or each key generation method. The encryption strength may be differently set by adjusting a length of the encryption key.

The secure communication target may be used to request the user to confirm whether the security mode is set for each recipient or used to automatically set the security mode for a separately assigned recipient group. Alternatively, the secure communication target may be used to automatically set the security mode for a recipient for whom secure communication was performed or used to request the user to confirm whether the security mode is set again. In this case, the encryption strength and the secure communication target may be set by being linked to each other. For example, an encryption key corresponding to a relatively high encryption strength may be allocated to a specific recipient or recipient group.

According to an exemplary embodiment, the security mode may be set by recognizing a user action, a gesture, or voice. Examples of the user action may be specific actions on a terminal, such as tapping the terminal a several number of times, rubbing a specific portion of the terminal, and the like. Examples of the gesture may be specific actions performed by the user who holds the terminal. According to another exemplary embodiment, the security mode may be set by recognizing biometric information containing an indication of the user which is related to the security mode. The biometric information may be recognized through, for example, a brain-computer interface (BCI) or a brain-machine interface (BMI). The contents of the security mode and a recognized action may be mapped to each other and stored in the terminal in advance.

According to an exemplary embodiment, when the encryption key included in the encrypted bitstream is a partial encryption key, the security module 210 may generate a second packet, which is different from a first packet related to the encrypted bitstream, for the remaining encryption key and provide the generated second packet to the communication module 230. When the encryption key included in the encrypted bitstream is a partial encryption key, the communication module 230 receives the second packet, which is different from the first packet related to the encrypted bitstream, and the security module 210 may acquire the remaining encryption key from the second packet. The second packet and the first packet may be transmitted and received through a same communication network or different communication networks. The second packet may be synchronized with the first packet and transmitted and received, may be transmitted and received at the same time as the first packet is transmitted and received, or may be transmitted and received prior to the first packet.

When the first and second terminals 110 and 130 employ the secure communication apparatus of FIG. 2, and secure communication is performed between the first and second terminals 110 and 130, each of the first and second terminals 110 and 130 may generate a bitstream encrypted with a different encryption key. That is, the first terminal 110 may use a first encryption key, whereas the second terminal 130 may use a second encryption key which is different from the first encryption key. According to another exemplary embodiment, the first and second terminals 110 and 130 may generate a bitstream encrypted by using a same encryption key appointed before starting the secure communication. According to another exemplary embodiment, after starting the secure communication, the second terminal 130 may acquire an encryption key from an encrypted bitstream received from the first terminal 110, generate an encrypted bitstream by using the acquired encryption key, and transmit the generated encrypted bitstream to the first terminal 110.

According to another exemplary embodiment, the security module 210 may generate a first encryption key to be used for encryption in a counterpart terminal or for decryption of a bitstream transmitted from the counterpart terminal. The key may be transmitted through a predetermined region of a bitstream generated by each terminal, e.g. an auxiliary region. The security module 210 may extract a second encryption key to be used for encryption from a bitstream, which is received from a counterpart terminal, encrypt at least a partial region of a first bitstream generated by a codec algorithm by using the second encryption key, and transmit the first bitstream including the encrypted region to the counterpart terminal. In addition, the security module 210 may decrypt a second bitstream including an encrypted region, which is received from the counterpart terminal, by using the first encryption key which has been transmitted to the counterpart terminal. Herein, the encrypted region in the bitstream may be the same region as the region in which the first or second encryption key is embedded or be different from the region in which the first or second encryption key is embedded, e.g., a payload region. That is, the security module 210 may generate a first encryption key to be transmitted to a counterpart terminal, encrypt at least a partial region of a bitstream by using a second encryption key transmitted from the counterpart terminal, and decrypt a bitstream including a region encrypted by the first encryption key, which is transmitted from the counterpart terminal, by using the first encryption key. The communication module 230 may transmit a bitstream in which the first encryption key is embedded or a bitstream including a region encrypted in the security module 210 to the counterpart terminal, and receive a bitstream in which the second encryption key is embedded or a bitstream including a region encrypted by the first encryption key from the counterpart terminal. The key may be updated in a predetermined period and transmitted to the counterpart terminal.

Figure 3:
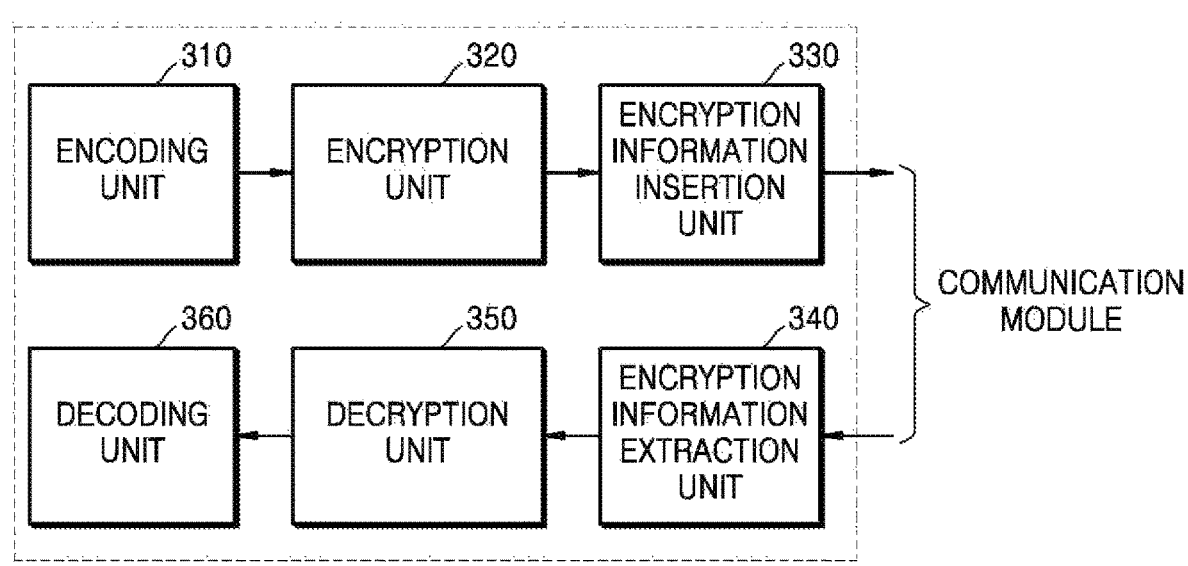
FIG. 3 illustrates a block diagram of a security module in the secure communication apparatus of FIG. 2, according to an exemplary embodiment of the inventive concept.

FIG. 3 illustrates a block diagram of the security module 210 in the secure communication apparatus of FIG. 2, according to an exemplary embodiment of the inventive concept.

The security module 210 of FIG. 3 may include an encoding unit 310, an encryption unit 320, an encryption information insertion unit 330, an encryption information extraction unit 340, a decryption unit 350, and a decoding unit 360. Herein, the overall or partial functions of the encryption unit 320 or the decryption unit 350 may be implemented in separate hardware, e.g., a universal subscriber identity module (USIM) which may be inserted into a terminal, a universal serial bus (USB) memory, or a near-field communicable microchip.

Referring to FIG. 3, the encoding unit 310 may generate a bitstream by encoding an input signal by a predetermined codec algorithm. Examples of the codec algorithm may be standard codec algorithms such as moving picture expert group (MPEG)-audio recommended by the international organization for standardization (ISO)/international electro-technical commission (IEC), G-series standard codec algorithms such as G.722 recommended by international telecommunication union-telecommunication (ITU-T), and proprietary codec algorithms except for the standard codec algorithms. The bitstream may include a parameter used for the encoding and encoded data, and a detailed format thereof may vary according to a codec algorithm. The bitstream may include a header region and a payload region and may additionally include an auxiliary region. Herein the auxiliary region may also exist in the header region or the payload region.

The encryption unit 320 encrypts at least a portion of data of the bitstream generated as the encoding result of the encoding unit 310. The encryption may be performed by encrypting at least a portion of data included in the header region or the payload region in the bitstream or by encrypting at least a portion of data included in both the header region and the payload region. According to another exemplary embodiment, at least a portion of data included in the auxiliary region may also be encrypted. According to another exemplary embodiment, data having a relatively small influence to quality of a restored signal may be encrypted.

A key-based encryption algorithm may be used for the encryption. Examples of the encryption algorithm may be algorithms using a symmetric key or a secret key, algorithms using an asymmetric key or a public key, algorithms using a symmetric key and an asymmetric key in a mixed way, and quantum encryption algorithms but are not limited thereto. The algorithms using a symmetric key or a secret key may use a stream encryption key such as RC4 or use a block encryption key such as RC5, IDEA, data encryption standard (DES), advanced encryption standard (AES), ARIA, SEED, triple DES (3DES), or the like but are not limited thereto. The algorithms using an asymmetric key or a public key may use a Rivest-Shamir-Adleman (RSA) public key but are not limited thereto.

The encryption information insertion unit 330 may generate an encrypted bitstream by inserting encryption information related to the encryption performed by the encryption unit 320 into the bitstream. The encrypted bitstream generated by the encryption information insertion unit 330 may be provided to the communication module (230 of FIG. 2). The encryption information may be included in the auxiliary region of the bitstream. According to another exemplary embodiment, the encryption information may be included in a region in the bitstream, which has a relatively small influence to quality of a restored signal. The encryption information may include information related to an encryption key. When the encryption key is fragmented and inserted into the bitstream, the encryption information may further include fragmentation information of the encryption key. The encryption information may further include an encryption flag indicating whether the bitstream is encrypted. The encryption flag may use a specific synchronization bit. The encryption flag may be inserted into the same region as the other encryption information or may be separately inserted into the header region. Alternatively, the encryption flag may be inserted into a location where an encrypted region starts. The encryption information may further include location information of the encrypted region. The location information may include a start location and an end location of the encrypted region. A specific synchronization bit may be inserted to the start location and the end location of the encrypted region. That is, information about an encrypted location, i.e., the encrypted region or frame, may be inserted together with the encryption flag. When a transmission and reception terminal recognizes in advance that the encryption started through a security mode setup, a separate encryption flag may not be needed. Alternatively, the encryption may be selectively performed for a predetermined number of frames, e.g., 64 frames, after the encryption flag is detected. Alternatively, when the transmission and reception terminal recognizes in advance that the encryption is performed for a predetermined region, separate location information may not be needed. The encryption information may be included in one region in the bitstream, e.g., the auxiliary region, or may be distributed to and inserted into a plurality of regions. In view of a decoder side, it may be determined that the encryption was performed for frames existing until an encryption end bit was detected after an encryption start bit had been detected. Alternatively, it may be determined that the encryption was performed every time a synchronization bit was detected, for example, for up to 64 frames.

The encryption information extraction unit 340 may extract encryption information from an encrypted bitstream provided by the communication module (230 of FIG. 2).

The decryption unit 350 may decrypt the encrypted bitstream by using the encryption information extracted by the encryption information extraction unit 340. In detail, the decryption may be performed using an encryption key included in the encryption information. The decryption unit 350 may operate by the same encryption algorithm as that used by the encryption unit 320.

The decoding unit 360 may decode the bitstream decrypted by the decryption unit 350. The decoding unit 360 may operate by the same codec algorithm as that used by the encoding unit 310.

According to another exemplary embodiment, the encryption unit 320 and the encryption information insertion unit 330 may be implemented as one processor to perform both the encryption and the encryption information insertion. In addition, the encryption information extraction unit 340 and the decryption unit 350 may also be implemented as one processor to perform both the encryption information extraction and the decryption.

Figure 4:
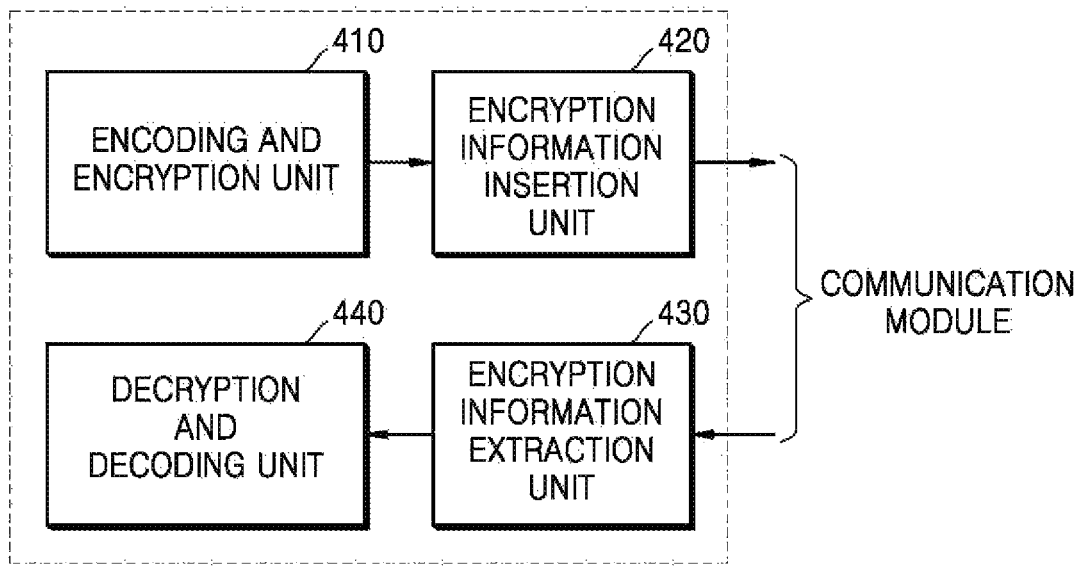
FIG. 4 illustrates a block diagram of a security module in the secure communication apparatus of FIG. 2, according to another exemplary embodiment of the inventive concept.

FIG. 4 illustrates a block diagram of the security module 210 in the secure communication apparatus of FIG. 2, according to another exemplary embodiment of the inventive concept.

The security module 210 of FIG. 4 may include an encoding and encryption unit 410, an encryption information insertion unit 420, an encryption information extraction unit 430, and a decryption and decoding unit 440.

Referring to FIG. 4, the encoding and encryption unit 410 may perform both encoding and encryption on an input signal. For the encoding and encryption, the same or similar codec algorithm and encryption algorithm as or to those in the encoding unit 310 and the encryption unit 320 of FIG. 3 may be applied. The encryption may be performed in a preset operation of an encoding process. The preset operation may vary according to a codec algorithm to be applied and may be, for example, a linear prediction coding operation or a quantization operation. In this case, in each operation, the encryption may be performed after a corresponding process is performed, or the corresponding process may be performed after the encryption is performed.

The encryption information insertion unit 420 may generate an encrypted bitstream by inserting encryption information related to the encryption into a bitstream. The encrypted bitstream generated by the encryption information insertion unit 420 may be provided to the communication module (230 of FIG. 2). The encryption information may include an encryption key inserted into an auxiliary region of the bitstream. According to another exemplary embodiment, the encryption information may include an encryption key inserted into a payload region together with data encrypted in an operation for encryption during the encoding process. In each case, when the encryption key is fragmented and inserted into the bitstream, the encryption information may further include fragmentation information of the encryption key. The encryption information may further include an encryption flag or location information of an encrypted region. The encryption information may further include information indicating the operation in which encryption has been performed during the encoding process.

The encryption information extraction unit 430 may extract encryption information from an encrypted bitstream provided by the communication module (230 of FIG. 2).

The decryption and decoding unit 440 may perform decryption and decoding on the encrypted bitstream by using the encryption information extracted by the encryption information extraction unit 430. In detail, the decryption and decoding may be performed using an encryption key included in the encryption information. For the decryption and decoding, the same or similar codec algorithm and encryption algorithm as or to those in the decryption unit 350 and the decoding unit 360 of FIG. 3 may be applied. The decryption may be performed in a preset operation of a decoding process. The preset operation may vary according to a codec algorithm to be applied and may be, for example, a linear prediction decoding operation or an inverse quantization operation. In this case, in each operation, a corresponding process may be performed after the decryption is performed, or the decryption may be performed after the corresponding process is performed.

In the present embodiment, the encryption information may be inserted into not only the auxiliary region but also, for example, a reserved field for use in the future or a not used field, in the header region.

The encoding and encryption unit 410 and the encryption information insertion unit 420 may be implemented as one processor to perform the encoding, the encryption, and the encryption information insertion together. In addition, the encryption information extraction unit 430 and the decryption and decoding unit 440 may also be implemented as one processor to perform the encryption information extraction, the decryption, and the decoding together.

Figure 5:
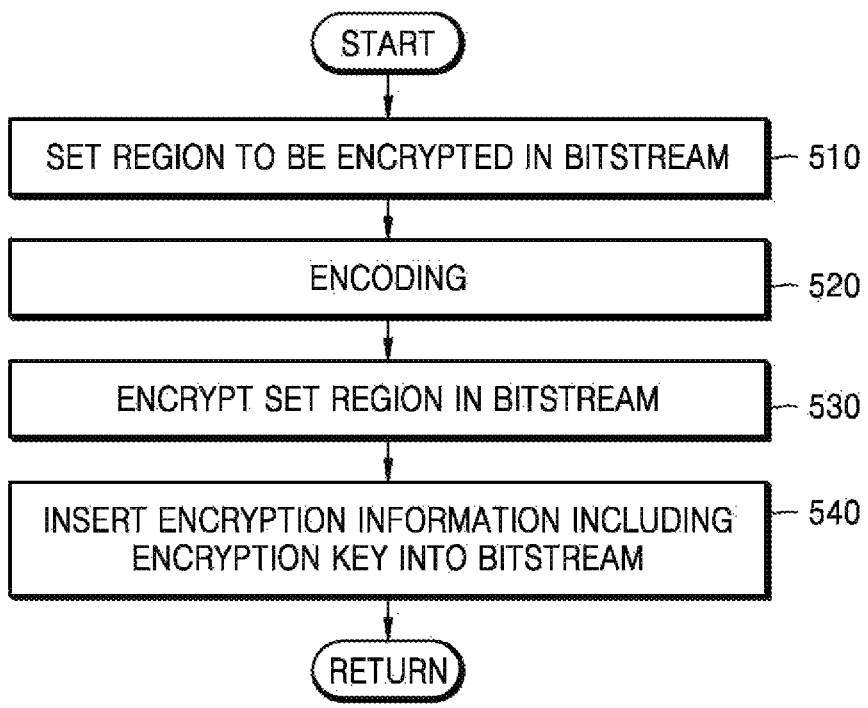
FIG. 5 illustrates a flowchart for describing an operation of an encoding and encryption method according to an exemplary embodiment of the inventive concept.

FIG. 5 illustrates a flowchart for describing an operation of an encoding and encryption method according to an exemplary embodiment of the inventive concept.

Referring to FIG. 5, in operation 510, a region to be encrypted in a bitstream is set. The region to be encrypted may be at least one of a header region, a payload region, and an auxiliary region.

In operation 520, a bitstream is generated by encoding an input signal.

In operation 530, the region set in operation 510 in the bitstream is encrypted using an encryption key.

In operation 540, encryption information including the encryption key is inserted into the bitstream. The encryption information may be inserted into at least one of the header region, the payload region, and the auxiliary region. According to another exemplary embodiment, the encryption information may be distributed and inserted into at least one of the header region, the payload region, and the auxiliary region.

Figure 6:
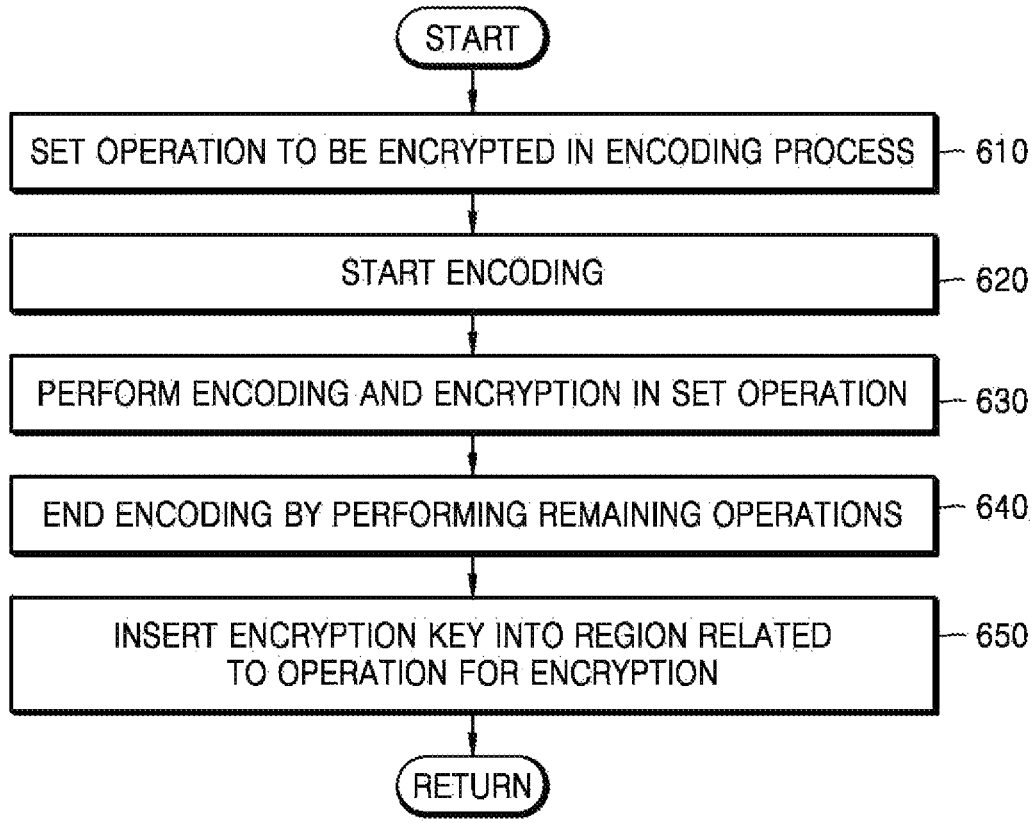
FIG. 6 illustrates a flowchart for describing an operation of an encoding and encryption method according to another exemplary embodiment of the inventive concept.

FIG. 6 illustrates a flowchart for describing an operation of an encoding and encryption method according to another exemplary embodiment of the inventive concept.

Referring to FIG. 6, in operation 610, an operation for encryption in an encoding process is set. The operation for encryption may vary according to a used codec algorithm and may be, for example, at least one of a linear prediction coding operation and a quantization operation.

In operation 620, encoding on an input signal is initiated. In operation 630, encoding and encryption are performed in the operation set in operation 610 during the encoding process. In this case, the encoding and the encryption may also be performed in a reverse order. In operation 640, the encoding process ends by performing the remaining operations of the encoding process.

In operation 650, an encryption key is inserted into a payload region, which is a region where data corresponding to the operation for encryption is located in a bitstream, or inserted into an auxiliary region. Operation 650 may be performed by being linked with operation 630. According to another exemplary embodiment, the encryption key may be inserted by being distributed to at least one of a header region, the payload region, and the auxiliary region or distributed to one region. When the first and second terminals 110 and 130 do not recognize an operation for encryption in advance, information indicating the operation for encryption may also be inserted into the bitstream.

Figure 7:
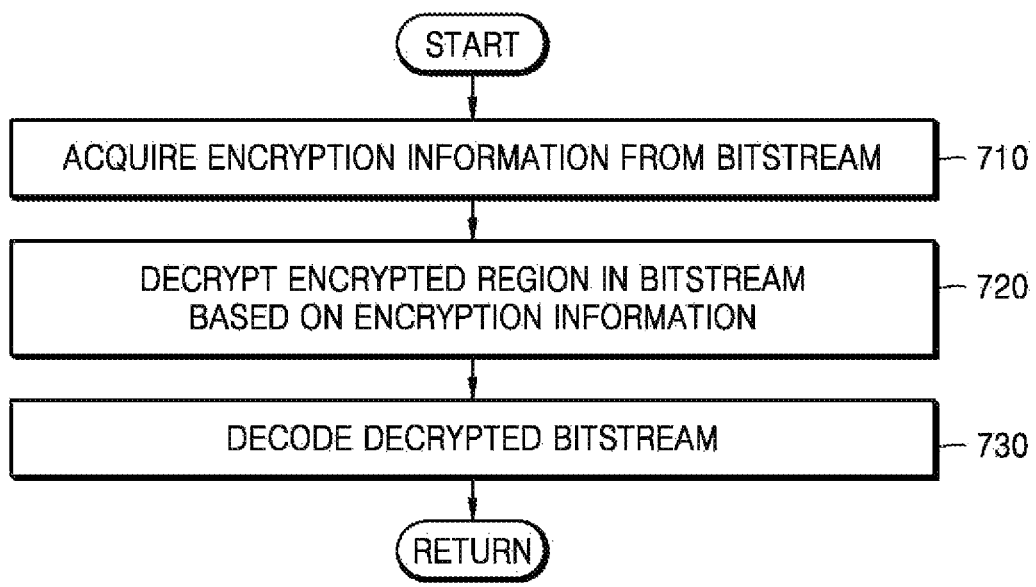
FIG. 7 illustrates a flowchart for describing an operation of a decoding and decryption method according to an exemplary embodiment of the inventive concept.

FIG. 7 illustrates a flowchart for describing an operation of a decoding and decryption method according to an exemplary embodiment of the inventive concept.

Referring to FIG. 7, in operation 710, encryption information including an encryption key is acquired from a received bitstream.

In operation 720, an encrypted region in the bitstream is decrypted based on the encryption information.

In operation 730, the bitstream decrypted in operation 720 is decoded.

Figure 8:
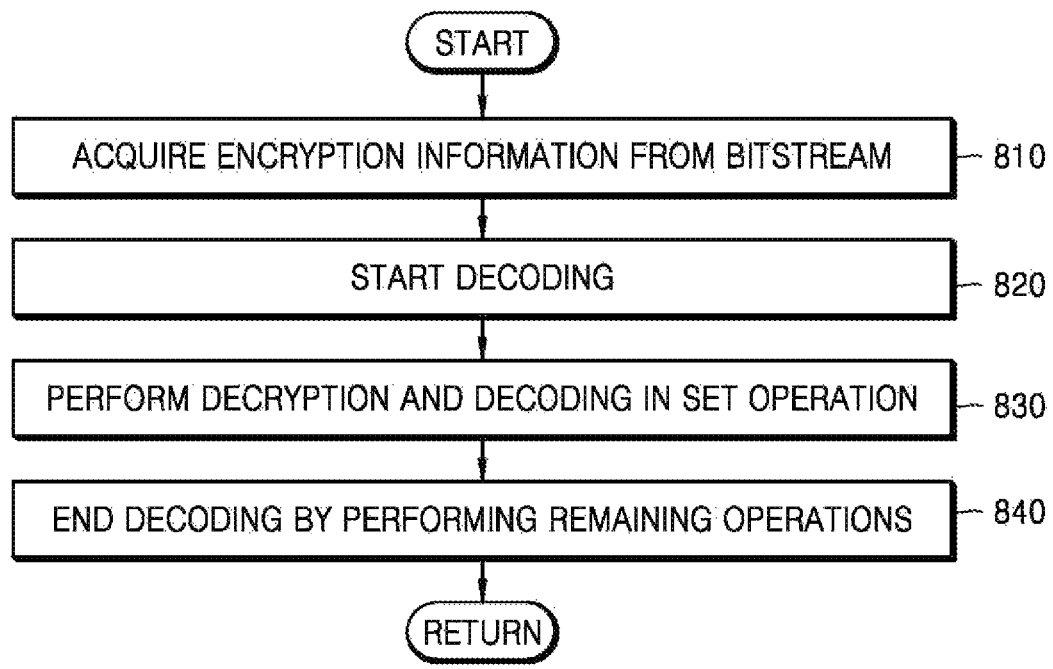
FIG. 8 illustrates a flowchart for describing an operation of a decoding and decryption method according to another exemplary embodiment of the inventive concept.

FIG. 8 illustrates a flowchart for describing an operation of a decoding and decryption method according to another exemplary embodiment of the inventive concept.

Referring to FIG. 8, in operation 810, an encryption key is acquired from a received bitstream. If the first and second terminals 110 and 130 do not recognize an operation for encryption in advance, information indicating the operation for encryption may be further acquired from the bitstream. For example, if the operation for encryption during an encoding process is at least one of a linear prediction coding operation and a quantization operation, decryption may be performed for the at least one of a linear prediction decoding operation and an inverse quantization operation during a decoding process. The encryption key may be acquired from a payload region, which is a region where data corresponding to the operation for encryption is located in the bitstream, or from an auxiliary region. According to another exemplary embodiment, the encryption key may be acquired by combining data distributed in each region or in one region on the basis of encryption information.

In operation 820, decoding on the received bitstream is initiated. In operation 830, decryption and decoding are performed if a current operation corresponds to the operation for encryption during the decoding process. In this case, the decryption and the decoding may also be performed in a reverse order. In operation 840, the decoding process ends by performing the remaining operations of the decoding process.

Figure 9:
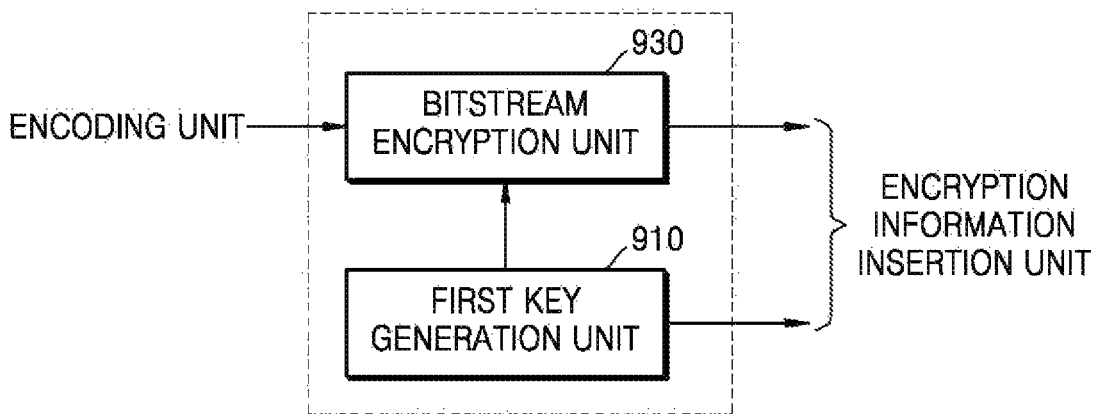
FIG. 9 illustrates a block diagram of an encryption unit in the security module of FIG. 3, according to an exemplary embodiment of the inventive concept.

FIG. 9 illustrates a block diagram of the encryption unit 320 of FIG. 3, according to an exemplary embodiment of the inventive concept, wherein the encryption unit 320 may include a first key generation unit 910 and a bitstream encryption unit 930.

Referring to FIG. 9, the first key generation unit 910 may generate an encryption key with respect to a bitstream. Herein, the encryption key may include a basic key for encrypting a partial region of the bitstream or the basic key and a reinforcement key. The basic key may include a plurality of keys. The reinforcement key may be a key for encrypting the basic key or a key for confirming a specific reception terminal. For example, for a DES algorithm, a 56-bit key may be generated as the basic or reinforcement key, and for an AES algorithm, a 128-, 192-, or 256-bit key may be generated as the basic or reinforcement key. The number for bits, i.e., a length, of the basic or reinforcement key may be set in correspondence with an encryption strength. The key may be generated in session units. A session may be defined as a call start time point to a call end time point, a predetermined time unit from the call start time point, or a predetermined time unit during a call. The key may be generated in a bitstream or packet unit or a frame unit. The key may be updated a session unit, a bitstream or packet unit, or a frame unit. The key may be provided to the bitstream encryption unit 930 and the encryption information insertion unit (330 of FIG. 3).

The bitstream encryption unit 930 may encrypt at least a portion of the bitstream by using the generated key. In detail, the bitstream encryption unit 930 may encrypt a header or payload region of the bitstream by using the basic key. According to an exemplary embodiment, at least a portion of the header or payload region may be encrypted by using a same basic key with respect to one session. According to another exemplary embodiment, the encryption may be performed using different basic keys updated for each frame or extracted from a database for each frame. According to another exemplary embodiment, the encryption may be performed using a same basic key for a preset number of frames, or the encryption may be performed using different basic keys for each selected frame. If specific fields or frames in the payload region are selectively encrypted, location information of the encrypted fields or frames may be included in the bitsream. Alternatively, an encryption start bit and an encryption end bit may be included in the payload region of the bitstream to indicate encrypted frames. Alternatively, an encryption flag, e.g., a synchronization bit, indicating that a predetermined number of frames are encrypted may be included in the bitstream.

Key information inserted into the bitstream may be key data as it is, an index indicating a key to be obtained from a mapping relationship of an equipped database, or a pointer value indicating a location where a key is stored. If a region enough to insert the key information does not exist in the bitstream, the index or the pointer value indicating the key may be inserted, or the key data may be fragmented and inserted. When the key data is fragmented and inserted, fragmentation information may be included in the bitstream.

Figure 10:
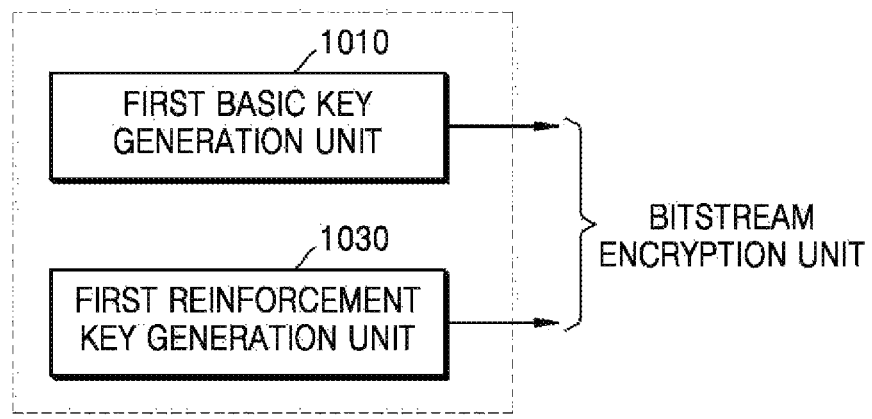
FIG. 10 illustrates a block diagram of a first key generation unit in the encryption unit of FIG. 9, according to an exemplary embodiment of the inventive concept.

FIG. 10 illustrates a block diagram of the first key generation unit 910 of FIG. 9, according to an exemplary embodiment of the inventive concept, wherein the first key generation unit 910 may include a first basic key generation unit 1010 and a first reinforcement key generation unit 1030 which is an option.

Referring to FIG. 10, the first basic key generation unit 1010 may generate a basic key for encrypting at least a portion of a bitstream. The basic key may be a symmetric key, an asymmetric key, or a mixed key.

The first reinforcement key generation unit 1030 may generate a reinforcement key for increasing an encryption strength. The reinforcement key may be a key for encrypting the basic key, a key for re-encrypting a region encrypted using the basic key, or information enabling decryption in a specific reception terminal. Examples of the reinforcement key may be a key similar to the basic key, a recipient identifier, and a reception terminal identifier. An example of the recipient identifier may be a telephone number of a recipient, and an example of the reception terminal identifier may be USIM information. However, the present exemplary embodiment is not limited thereto.

Figure 11:
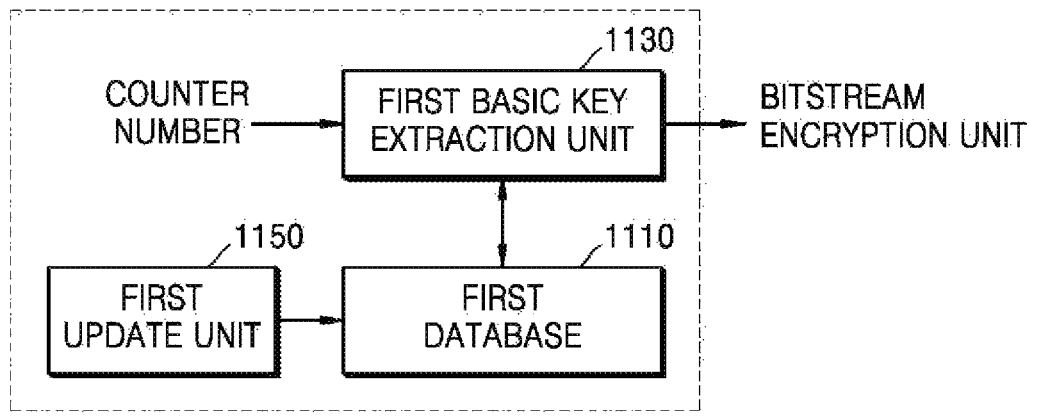
FIG. 11 illustrates a block diagram of a first basic key generation unit in the first key generation unit of FIG. 10, according to an exemplary embodiment of the inventive concept.

FIG. 11 illustrates a block diagram of the first basic key generation unit 1010 of FIG. 10, according to an exemplary embodiment of the inventive concept, wherein the first basic key generation unit 1010 may include a first database 1110, a first basic key extraction unit 1130, and a first update unit 1150 which is an option.

Referring to FIG. 11, the first database 1110 may map and store a plurality of count numbers and a plurality of pieces of key data. Herein, a count number may correspond to a pointer value. In addition, an index corresponding to the key data may be additionally mapped to the key data and stored. The number of bits of the index may be less than the number of bits of the key data. The key data may have a different number of bits and values according to algorithms to be used for encryption. The first database 1110 may be provided for each encryption algorithm or for each encryption strength.

The first basic key extraction unit 1130 may extract a basic key from the first database 1110. The basic key may be extracted in correspondence with a counter number which increases or decreases by 1 or by a predetermined unit. In detail, the counter number may be set to increases or decreases by 1 or by a predetermined unit in correspondence with a key generation unit or a key update unit. The extracted basic key may be provided to the bitstream encryption unit (930 of FIG. 9).

The first update unit 1150 may update the basic key in a predetermined period and store the updated basic key in the first database 1110.

According to an exemplary embodiment, by mapping the basic key in several stages, information for generating the basic key may be distributed and stored in a plurality of first databases 1110, e.g., a terminal and a device other than the terminal. Examples of the device may be a USIM which may be inserted into the terminal, a USB memory, a near-field communicable microchip, or a smart watch.

Figure 12:
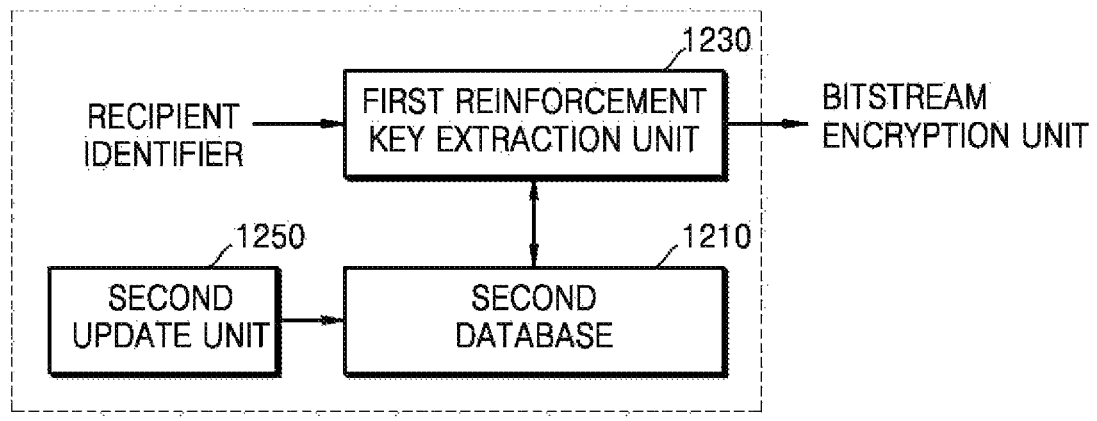
FIG. 12 illustrates a block diagram of a first reinforcement key generation unit in the first key generation unit of FIG. 10, according to an exemplary embodiment of the inventive concept.

FIG. 12 illustrates a block diagram of the first reinforcement key generation unit 1030 of FIG. 10, according to an exemplary embodiment of the inventive concept, wherein the first reinforcement key generation unit 1030 may include a second database 1210, a first reinforcement key extraction unit 1230, and a second update unit 1250 which is an option.

Referring to FIG. 12, the second database 1210 may map and store a recipient identifier, e.g., a telephone number of a recipient, and a reception terminal identifier. The second database 1210 may be provided for each recipient group.

The first reinforcement key extraction unit 1230 may generate a reinforcement key using a telephone number of a recipient if a security mode is set after a call for inter-terminal telephonic communication is set or the call for telephonic communication between the terminals is set after the security mode is set. Alternatively, the first reinforcement key extraction unit 1230 may generate the reinforcement key by extracting a reception terminal identifier mapped to the telephone number of the recipient from the second database 1210.

The second update unit 1250 may allow a user to add information on a recipient and a reception terminal with which the user desires to perform secure communication to the second database 1210 or to delete or modify information stored in the second database 1210, through a user interface.

If the reinforcement key is a key for encrypting a basic key or a key for re-encrypting a region encrypted using the basic key, the first reinforcement key generation unit 1030 may be configured to be the same as the first basic key generation unit 1300 of FIG. 11.

The configuration of the first key generation unit 910 illustrated in FIGS. 10 to 12 may be applied to the encoding and encryption unit 410 of FIG. 4.

Figure 13:
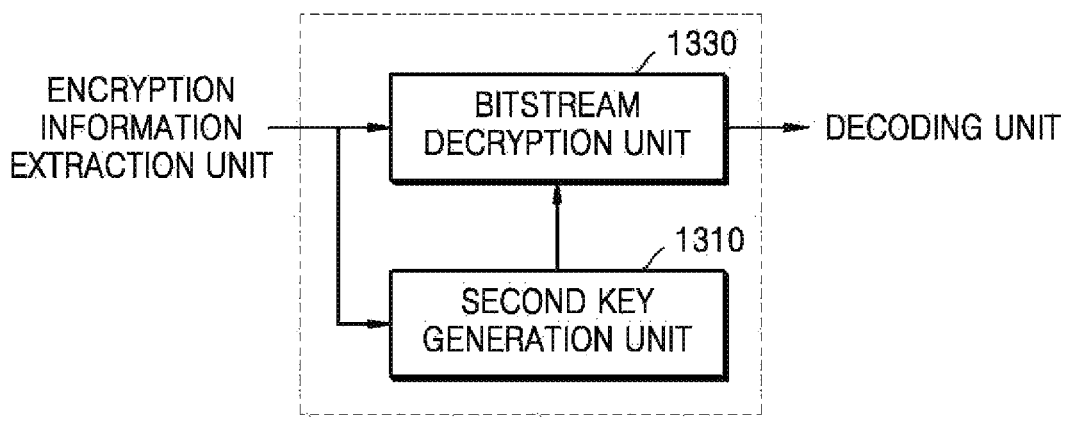
FIG. 13 illustrates a block diagram of a decryption unit in the security module of FIG. 3, according to an exemplary embodiment of the inventive concept.

FIG. 13 illustrates a block diagram of the decryption unit 350 of FIG. 3, according to an exemplary embodiment of the inventive concept, wherein the decryption unit 350 may include a second key generation unit 1310 and a bitstream decryption unit 1330.

Referring to FIG. 13, the second key generation unit 1310 may generate a key to be used for a predetermined encryption algorithm from the encryption information provided by the encryption information extraction unit (330 of FIG. 3). Herein, the key may include a basic key or the basic key and a reinforcement key. For example, when a DES algorithm is used, a 56-bit basic key may be acquired from a bitstream, and when an AES algorithm is used, a 128-, 192-, or 256-bit basic key may be acquired. Alternatively, when the DES algorithm is used, an index or a pointer value indicating a 56-bit basic key may be acquired from a bitstream, and when the AES algorithm is used, an index or a pointer value indicating a 128-, 192-, or 256-bit basic key may be acquired. A basic key or an index or pointer value indicating the basic key embedded in a bitstream in a session unit may be acquired. Alternatively, a basic key or an index or pointer value indicating the basic key embedded in a bitstream in a bitstream or packet unit or in a frame unit may be acquired. When an index or pointer value indicating a basic key is acquired, the basic key corresponding to the index or pointer value may be generated with reference to a mapping relationship in a database equipped in a terminal. The basic key generated by the second key generation unit 1310 may be provided to the bitstream decryption unit 1330.

The bitstream decryption unit 1330 may decrypt an encrypted bitstream, e.g., a payload region, by using the key provided from the second key generation unit 1310. According to an exemplary embodiment, the decryption may be performed using a same basic key for one session. According to another exemplary embodiment, the encrypted bitstream may be decrypted using a different basic key for each frame. According to another exemplary embodiment, when specific fields or frames of the payload region are selectively encrypted, location information of the encrypted fields or frames may be acquired from key information, and the specific fields or frames may be decrypted using a same basic key or different basic keys on the basis of the location information. If a portion of a header region is encrypted, the portion of the header region may be decrypted using a same basic key for one session. If the key includes a basic key and a reinforcement key, whether a reception terminal is a specific terminal indicated by the reinforcement key is determined, and if the reception terminal is the specific terminal, the encrypted bitstream may be decrypted based on the basic key. Otherwise, if the reception terminal is not the specific terminal indicated by the reinforcement key, the encrypted bitstream may not be decrypted. If the reinforcement key is a key obtained by encrypting the basic key, the basic key may be decrypted using the reinforcement key, and the encrypted bitstream may be decrypted using the decrypted basic key. If the reinforcement key is a key obtained by re-encrypting a region encrypted using the basic key, the encrypted bitstream may be decrypted by sequentially applying the reinforcement key and the basic key.

Figure 14:
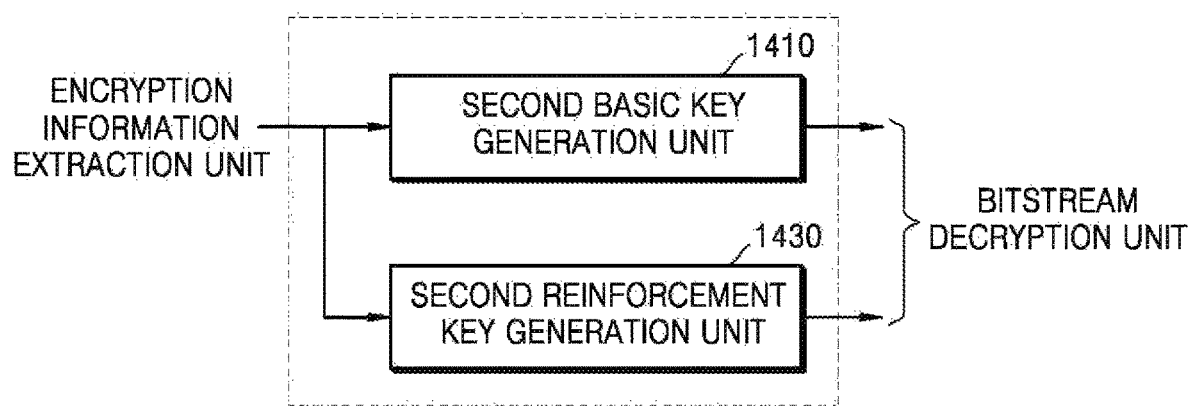
FIG. 14 illustrates a block diagram of a second key generation unit in the decryption unit of FIG. 13, according to an exemplary embodiment of the inventive concept.

FIG. 14 illustrates a block diagram of the second key generation unit 1310 of FIG. 13, according to an exemplary embodiment of the inventive concept, wherein the second key generation unit 1310 may include a second basic key generation unit 1410 and a second reinforcement key generation unit 1430 which is an option.

Referring to FIG. 14, the second basic key generation unit 1410 may generate a basic key for decrypting an encrypted bitstream from the encryption information provided by the encryption information extraction unit (330 of FIG. 3). The basic key may be a symmetric key, an asymmetric key, or a mixed key. The second basic key generation unit 1410 may generate a basic key by a different method depending on whether a key, an index or a pointer value indicating the key, or fragmentation information of the key is included in the encryption information provided by the encryption information extraction unit (330 of FIG. 3). If key data is included in the encryption information provided by the encryption information extraction unit (330 of FIG. 3), the second basic key generation unit 1410 may generate a basic key using the key data as it is. If an index or a pointer value indicating a key is included in the encryption information provided by the encryption information extraction unit (330 of FIG. 3), the second basic key generation unit 1410 may generate a basic key by searching an equipped database for key data mapped to the index or pointer value. If fragmentation information of a key is included in the encryption information provided by the encryption information extraction unit (330 of FIG. 3), the second basic key generation unit 1410 may generate a basic key by combining the segmented and inserted key based on the fragmentation information of the key.

The second reinforcement key generation unit 1430 may generate a reinforcement key from the encryption information provided by the encryption information extraction unit (330 of FIG. 3). The reinforcement key may be a key used to encrypt the basic key, a key used to re-encrypt a region encrypted using the basic key, or information enabling decryption in a specific terminal. Examples of the reinforcement key may be a key similar to the basic key, a recipient identifier, and a reception terminal identifier. An example of the recipient identifier may be a telephone number of a recipient, and an example of the reception terminal identifier may be USIM information.

Figure 15:
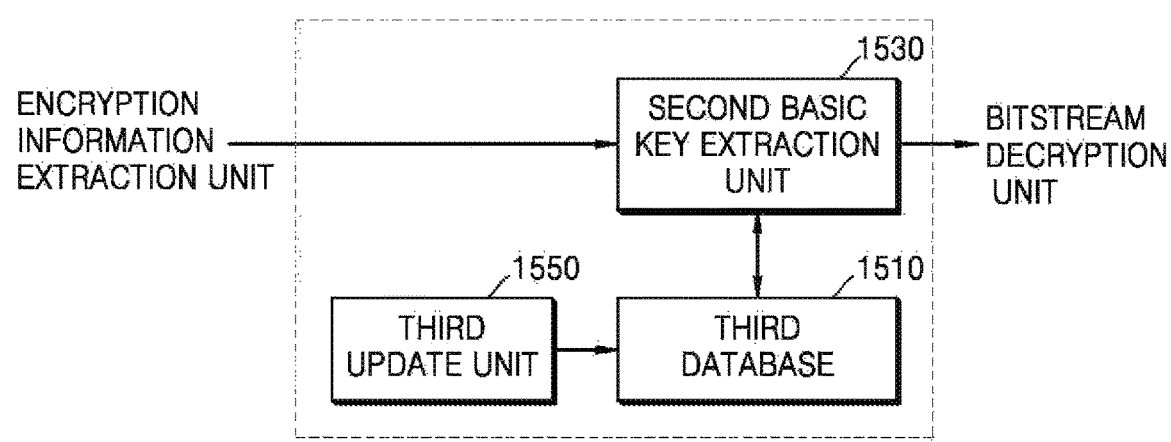
FIG. 15 illustrates a block diagram of a second basic key generation unit in the second key generation unit of FIG. 14, according to an exemplary embodiment of the inventive concept.

FIG. 15 illustrates a block diagram of the second basic key generation unit 1410 of FIG. 14, according to an exemplary embodiment of the inventive concept, wherein the second basic key generation unit 1410 may include a third database 1510, a second basic key extraction unit 1530, and a third update unit 1550. The third update unit 1550 is an option and may be implemented to be the same as or similar to the first update unit 1050 of FIG. 11.

Referring to FIG. 15, the third database 1510 may map and store a plurality of pointer numbers and a plurality of pieces of key data. In addition, an index corresponding to the key data may be additionally mapped to the key data and stored. The third database 1510 may be implemented to be the same as or similar to the first database 1010 of FIG. 10.

When an index or a pointer value of a basic key is provided from the encryption information extraction unit (330 of FIG. 3), the second basic key extraction unit 1530 may extract a basic key mapped to the index or pointer value from the third database 1510. The extracted basic key may be provided to the bitstream decryption unit (1330 of FIG. 13).

If a reinforcement key is a key used to encrypt the basic key or a key used to re-encrypt a region encrypted using the basic key, the second reinforcement key generation unit 1430 may be configured to be the same as the second basic key generation unit 1410 of FIG. 15.

The configuration of the second key generation unit 1310 illustrated in FIGS. 14 and 15 may also be applied to the decryption and decoding unit 440 of FIG. 4.

As described above, by encrypting a partial region of a bitstream instead of encrypting the entire bitstream, it is not necessary to change a communication protocol, and thus the existing communication network and the existing codec algorithm may be used as they are.

In addition, by inserting key information used for encryption into a bitstream and transmitting the bitstream, it is not necessary to share a key in advance, and thus inter-terminal secure communication may be performed even without using a server for key distribution or management. As a result, repulsion of a user due to user information remaining in the server when secure communication is used may be removed, and thus a market share of a terminal for secure communication may increase.

Figure 16A:
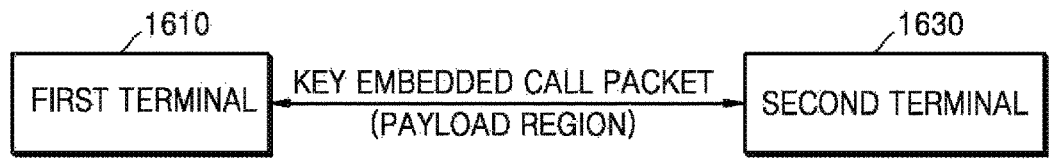
FIGS. 16A to 16C illustrate diagrams for describing the concept of a secure communication method according to another exemplary embodiment of the inventive concept.
Figure 16B:
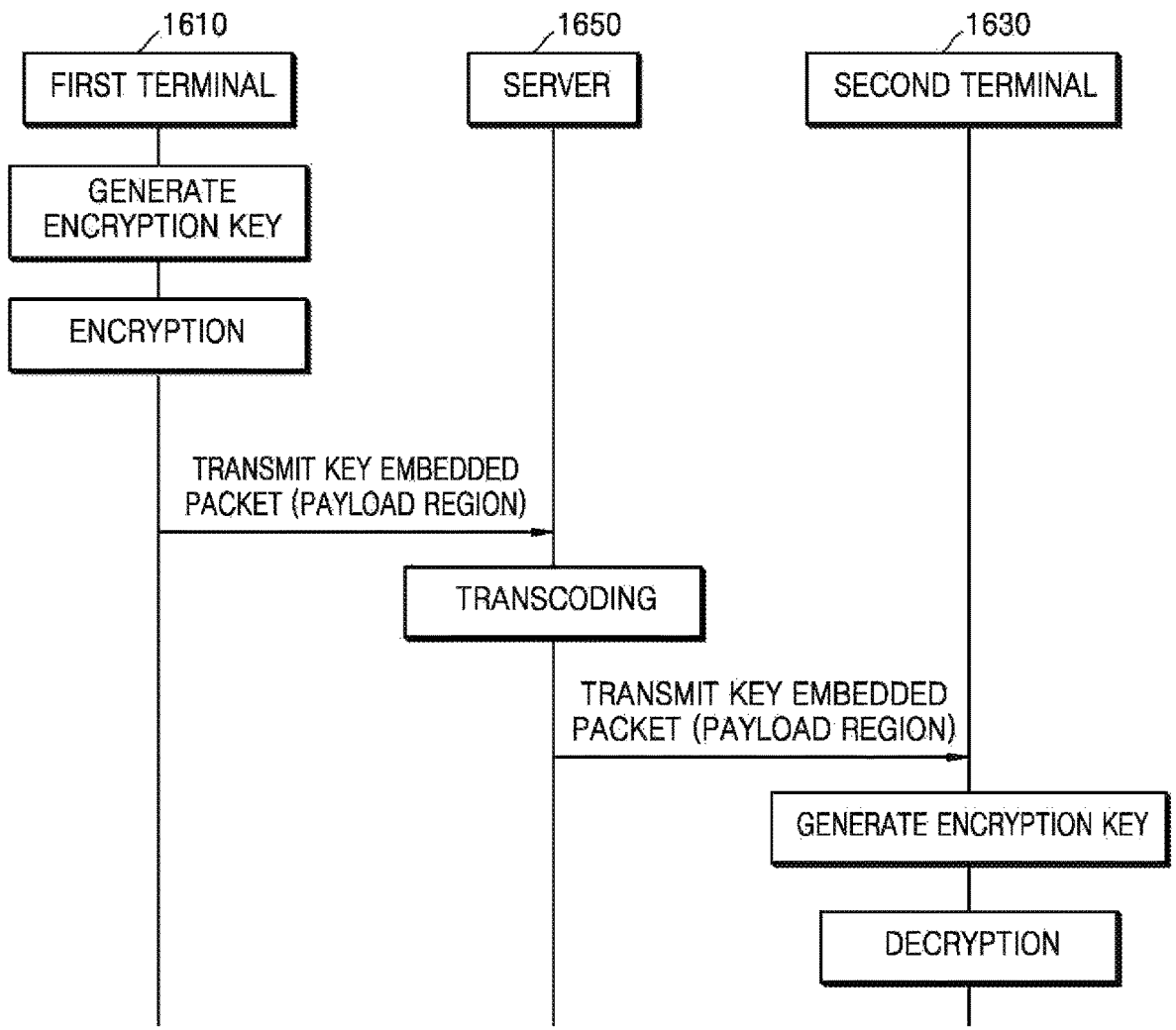
Figure 16C:
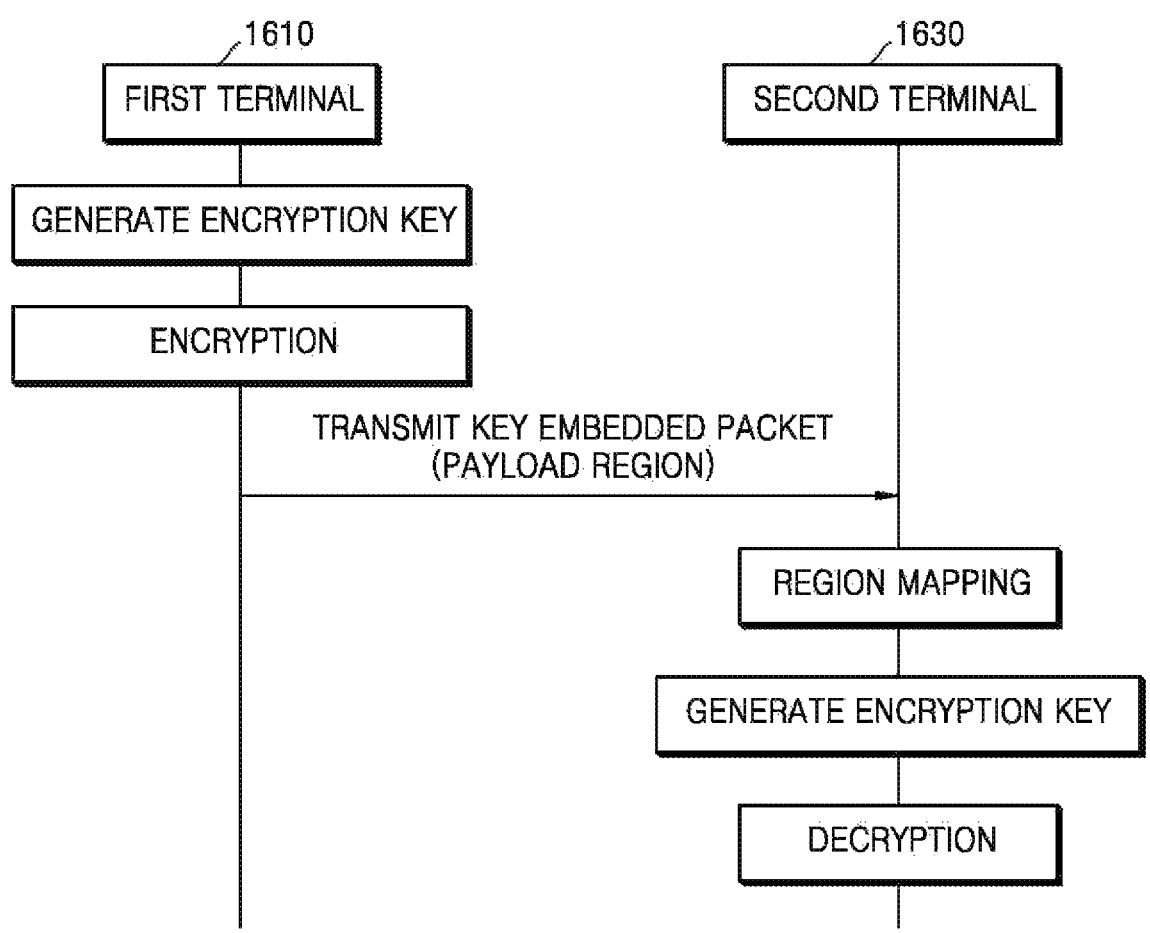

FIGS. 16A to 16C illustrate diagrams for describing the concept of a secure communication method according to another exemplary embodiment of the inventive concept, wherein the secure communication method may be applied to relatively reliable and stable secure communication when a transmission terminal and a reception terminal use different codec algorithms.

Bitstreams generated by different (first and second) codec algorithms may have different formats of an auxiliary region. For this case, according to the secure communication method illustrated in FIGS. 16A to 16C, a first terminal 1610 may insert an encryption key of encryption information into a payload region of a bitstream instead of an auxiliary region of the bitstream and transmit the bitstream to a second terminal 1630. The first terminal 1610 generates the encryption key and encrypts at least a portion of data forming the bitstream. The first terminal 1610 embeds the encryption information including the encryption key in the bitstream, generates a key embedded call packet, and transmits the key embedded call packet to the second terminal 1630 or a server 1650 through a communication channel. According to an exemplary embodiment, the encryption information may be included in the payload region of the bitstream. The second terminal 1630 or the server 1650 receives the key embedded call packet and additionally processes the bitstream according to a different (the first) codec algorithm. The second terminal 1630 acquires the encryption information from the processed bitstream and performs decryption by using the encryption key obtained from the encryption information.

FIG. 16B is an example in which the additional processing according to the different (first and second) codec algorithms is performed by the server 1650, wherein the server 1650 has information on the first and second codec algorithms which the first and second terminals 1610 and 1630 respectively use and has a transcoding algorithm. The server 1650 may compare a type of the first codec algorithm used in the first terminal 1610 with a type of the second codec algorithm used in the second terminal 1630. The server 1650 may provide a call packet as it is to the second terminal 1630 when the types of the first and second codec algorithms are same, and may perform transcoding and provide a transcoded call packet to the second terminal 1630 when the type of the first codec algorithm used in the first terminal 1610 differs from the type of the second codec algorithm used in the second terminal 1630. The first and second codec algorithms which the first and second terminals 1610 and 1630 respectively use may be, for example, AMR-WB and AMR-NB. Alternatively, the first and second codec algorithms which the first and second terminals 1610 and 1630 respectively use may be, for example, different CELP-format algorithms. Alternatively, the first and second codec algorithms which the first and second terminals 1610 and 1630 respectively use may be, for example, different two of G.711, G.723.1, G.726, and G.729. An example of the transcoding may be region mapping on a bitstream generated by the first or second codec algorithm which has similar characteristics. In detail, the server 1650 may generate a bitstream corresponding to the second codec algorithm used in the second terminal 1630 by transcoding the bitstream of the first codec algorithm used in the first terminal 1610.

When the first and second terminals 1610 and 1630 use different codec algorithms, a format of a bitstream or a format of each region or field forming the bitstream may vary, and in particular, the possibility that a format of an auxiliary region is not specified is very high, and thus the possibility that data in the auxiliary region is lost through a transcoding process in the server 1650 is high. Therefore, the encryption information insertion unit 330 of FIG. 3 or the encryption information insertion unit 420 of FIG. 4 may insert an encryption key into a payload region and transmit a bitstream.

FIG. 16C is an example in which the additional processing according to the different (first and second) codec algorithms is performed by the second terminal 1630. The second terminal 1630 may compare the type of the first codec algorithm used in the first terminal 1610 with the type of the second codec algorithm used in the second terminal 1630. The second terminal 1630 may perform normal decoding or decryption and decoding on a call packet when the types of the first and second codec algorithms are same, and may perform region mapping and perform decryption and decoding when the type of the first codec algorithm used in the first terminal 1610 differs from the type of the second codec algorithm used in the second terminal 1630.

Figure 17A:
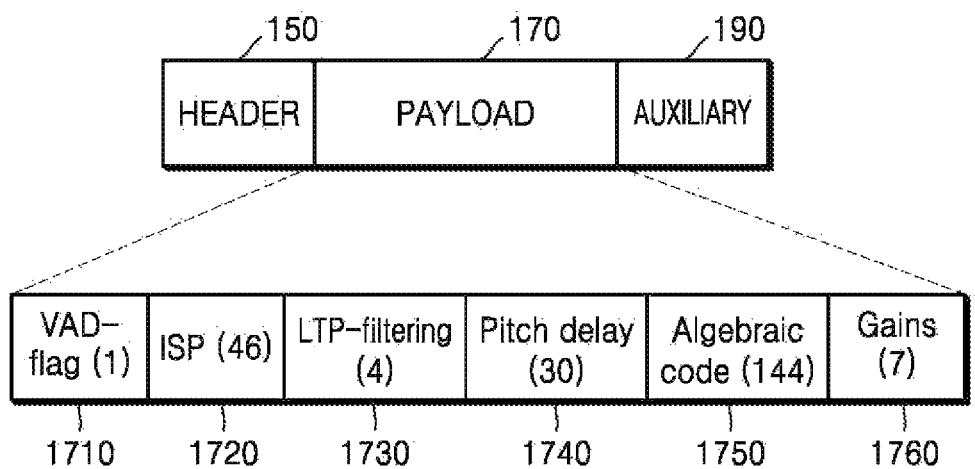
FIGS. 17A and 17B illustrate an example of a payload region which is encrypted or into which an encryption key is inserted in a bitstream and frame structures according to different codec algorithms.

FIG. 17A is an example of a payload region 170 in a bitstream, which is encrypted or into which an encryption key is inserted, wherein an AMR-WB codec algorithm of a 12.65-kb/s bit rate is used.

Referring to FIG. 17A, the bitstream includes a header region 150, the payload region 170, and an auxiliary region 190. The payload region 170 may include a VAD-flag field 1710, an ISP field 1720, a long term prediction (LTP)-filtering field 1730, a pitch delay field 1740, an algebraic code field 1750, and a gain field 1760.

Encryption on at least one of, for example, the ISP field 1720, the pitch delay field 1740, and the algebraic code field 1750 may be performed, the encryption key may be embedded in a field on which the encryption has been performed. In this case, the encryption key may be inserted at a time point where data included in each field is generated during an encoding process or inserted into each field after the encoding process. According to another exemplary embodiment, the encryption key may be inserted into a location of the fields included in the payload region 170 such that an influence affecting quality of a restored voice signal is minimized.

According to the exemplary embodiment described above, since a format or a location is defined for each codec algorithm, by embedding the encryption key in the preserved payload region 170 and transmitting the bitstream, it is not necessary to share the encryption key in advance between the first and second terminals 1610 and 1630, and even when the second terminal 1630 or the server 1650 performs transcoding, e.g., region mapping, according to the use of different codec algorithms in the first and second terminals 1610 and 1630, the encryption may be prevented from being damaged.

Figure 17B:
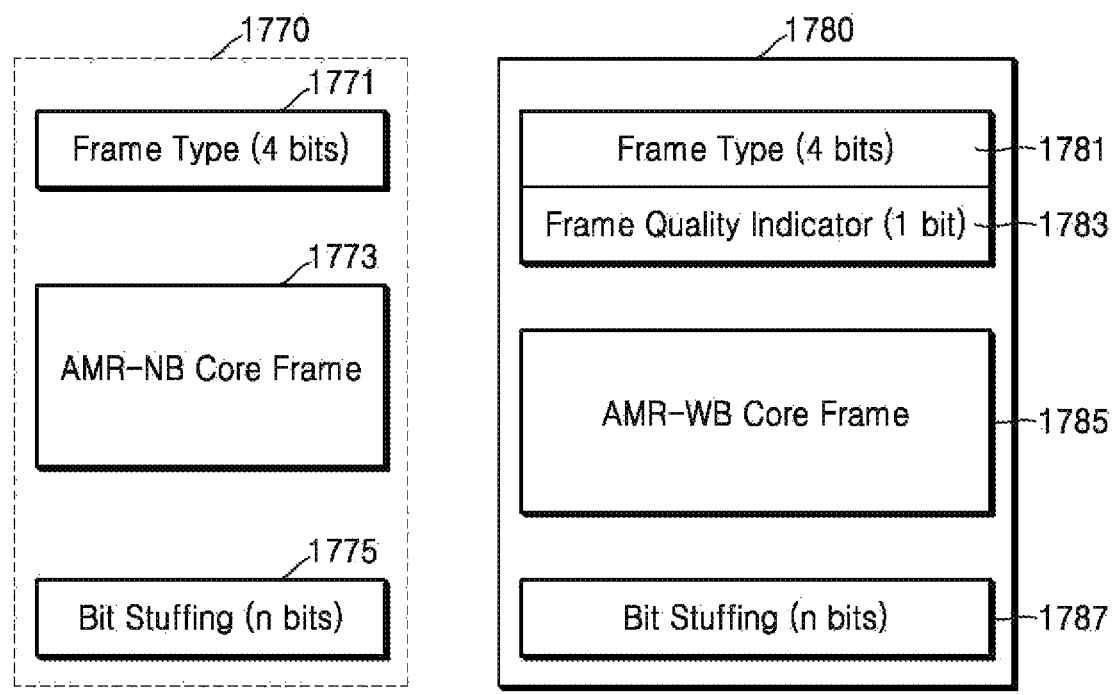

FIG. 17B illustrates a reserved field or a skip field in a bitstream, wherein reference numeral 1770 denotes an AMR-NB IF2 frame structure, and reference numeral 1780 denotes an AMR-WB IF2 frame structure.

An AMR-NB frame 1770 may include a frame type field 1771, an AMR-NB core frame field 1773, and a bit-stuffing field 1775. The frame type field 1771 may be included in a header region, the AMR-NB core frame field 1773 may include voice data or comfort noise data and may be included in a payload region, and the bit-stuffing field 1775 may correspond to an auxiliary region. An AMR-WB frame 1780 may include a frame type field 1781, a frame quality indicator 1783, an AMR-WB core frame field 1785, and a bit-stuffing field 1787. The frame type field 1781 and the frame quality indicator 1783 may be included in a header region, the AMR-WB core frame field 1785 may include voice data or comfort noise data and may be included in a payload region, and the bit-stuffing field 1787 may correspond to an auxiliary region.

In the AMR-NB frame 1770 and the AMR-WB frame 1780, the bit-stuffing field 1775 and the bit-stuffing field 1787 are regions provided for octet alignment. When a transmission terminal and a reception terminal use a same codec algorithm, key data, key information including an index or a pointer value of a key, or segmented key data and key segmentation information may be inserted into the auxiliary region such as the bit-stuffing field 1775 or 1787. When the transmission terminal and the reception terminal use different codec algorithms, key data, key information including an index or a pointer value of a key, or segmented key data and key segmentation information may be inserted into the payload region such as the AMR-NB core frame field 1773 or the AMR-WB core frame field 1785.

Figure 18A:
FIGS. 18A and 18B illustrate diagrams for describing the concept of a secure communication method according to another exemplary embodiment of the inventive concept.
Figure 18B:
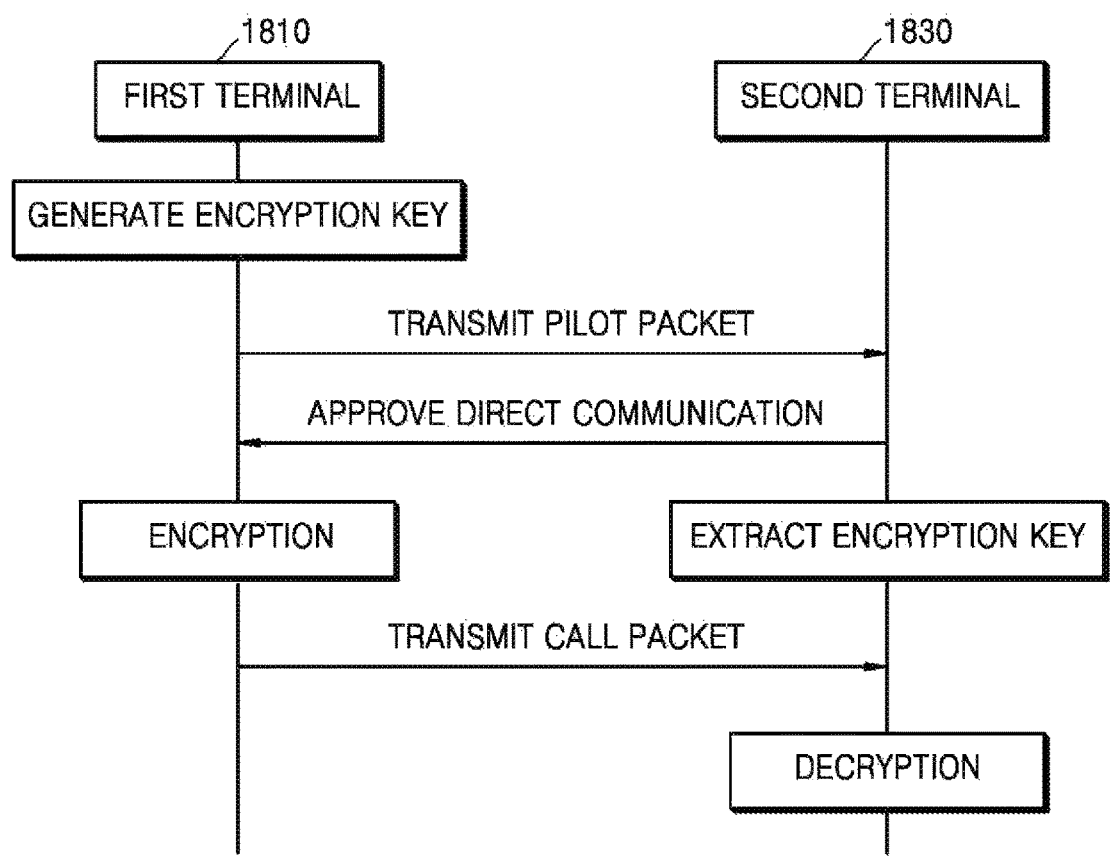

FIGS. 18A and 18B illustrate diagrams for describing the concept of a secure communication method according to another exemplary embodiment of the inventive concept.

According to the secure communication method illustrated in FIGS. 18A and 18B, a first terminal 1810 forms a call packet including a bitstream, embeds encryption key information in a pilot packet to be received by a second terminal 1830, and transmits the pilot packet to the second terminal 1830 through a communication channel before the second terminal 1830 receives a call packet. The communication channel is a direct communication channel and may be a communication channel for board-to-board (B2B), machine-to-machine (M2M), or device-to-device (D2D).

Both the first terminal 1810 and the second terminal 1830 illustrated in FIGS. 18A and 18B may be implemented using a secure communication terminal including the secure communication device in FIGS. 2 to 5 but are not limited thereto. In addition, the first terminal 1810 and the second terminal 1830 may have a D2D direct communication application or may be able to perform direct communication. The secure communication method illustrated in FIGS. 18A and 18B is to provide a method of transmitting key information for secure communication when D2D direct communication within a predetermined radius or inter-terminal relay communication deviating from the predetermined radius is applied.

The D2D direct communication or the inter-terminal relay communication may be supported within a frequency band set for cellular communication or a frequency band separately set for the D2D direct communication or the inter-terminal relay communication. That is, when a terminal does not need to separately enter into a cellular network for the D2D direct communication, or when the terminal needs to enter into the cellular network in advance, both cases may be supported. In each case, if a direct communication link is formed, data transmission between terminals may be performed without communication with a base station or relay of a miniaturized base station such as a picocell or femtocell.

An operation framework of the D2D direct communication may largely include three operations. A first operation is a peer discovery operation of discovering, by an arbitrary first terminal 1810, neighboring second terminals 1830 capable of performing direct communication, a second operation is a paging operation of discovering a desired second terminal 1830 and requesting for direct communication with the corresponding second terminal 1830, and a third operation is a data transmission operation of transmitting and receiving a call packet through a direct communication channel set between the corresponding terminals 1810 and 1830.

The first or second operation may be performed by a central control method by which a base station selects terminals to which a signal is to be transmitted, collects discovery information from the terminals, and determines terminal discovery or a distributed control method by which terminals directly perform discovery while transmitting and receiving signals without a special intervention of a base station. Hereinafter, it is assumed that each terminal is in an active state for direct communication. The active state for direct communication indicates a terminal state in which a terminal for or capable of performing D2D direct communication receives control information necessary for D2D direct communication from a base station and performs direct communication according to a D2D direct communication operation framework based on the control information. Alternatively, the active state for direct communication may indicate a terminal state in which a terminal is capable of performing direct communication according to a D2D direct communication operation framework as a result of performing a direct communication application. In order for an arbitrary terminal to perform direct communication, the terminal needs to be in the active state for direct communication, and the terminal in the active state for direct communication may transmit and receive a peer discovery packet for direct communication.

According to an exemplary embodiment, the first terminal 1810 may transmit a peer discovery packet through a cellular communication channel or a direct communication channel to discover a terminal with which direct communication is possible. The peer discovery packet may include an identification (ID) of the first terminal 1810, a discovery message, and key information for secure communication. The second terminal 1830 located within a radius in which direct communication with the first terminal 1810 is possible receives the peer discovery packet, transmits an approval message for approving direct communication to the first terminal 1810, and may extract and store key information included in the peer discovery packet. The key information may be key data, an index of the key data, or a pointer value of a database in which the key data is stored. Thereafter, a call packet may be transmitted and received between the first terminal 1810 and the second terminal 1830 through a direct communication channel in the normal mode or the security mode.

According to another exemplary embodiment, if the second terminal 1830 capable of performing direct communication is discovered under control of a base station or by the first terminal 1810, the first terminal 1810 may transmit a synchronization packet for direct communication to the second terminal 1830 before a call packet is transmitted and received between the first and second terminals 1810 and 1830. Herein, the synchronization packet may include key information for secure communication. The second terminal 1830 may receive the synchronization packet and extract and store the key information for secure communication. Thereafter, a call packet may be transmitted and received between the first terminal 1810 and the second terminal 1830 through a direct communication channel in the normal mode or the security mode.

According to another exemplary embodiment, the first terminal 1810 may transmit a direct communication request packet to call the second terminal 1830 through a base station or without the base station therebetween. The direct communication request packet may include the ID of the first terminal 1810, an ID of the second terminal 1830, a direct communication request message, and key information for secure communication. If the second terminal 1830 corresponding to the ID of the second terminal 1830, which is included in the direct communication request packet, is located within a direct communication possible distance, the second terminal 1830 receives the direct communication request packet through a direct communication link, transmits a direct communication approval message to a transmission terminal (the first terminal 1810), and may extract and store the key information included in the direct communication request packet. Thereafter, a call packet may be transmitted and received between the first terminal 1810 and the second terminal 1830 through the direct communication link or a relay communication link in the normal mode or the security mode. If the second terminal 1830 corresponding to the ID of the second terminal 1830, which is included in the direct communication request packet, is located out of the direct communication possible distance. The first terminal 1810 may deliver the direct communication request packet to the second terminal 1830 through the relay communication link. When the second terminal 1830 receives the direct communication request packet through a relay communication channel, the second terminal 1830 transmits a direct communication approval message to the first terminal 1810 through the relay communication channel and may extract and store the key information included in the direct communication request packet.

The first terminal 1810 and the second terminal 1830, which are devices supporting D2D direct communication or inter-terminal relay communication, may use a same D2D direct communication or inter-terminal relay communication technique or standard, embed a same encryption algorithm, and perform a peer discovery function, a direct communication request and approval function, or a synchronization request and approval function. Examples of a technique applicable to the D2D direct communication may be a Wi-Fi Direct technique, a FlashLinQ technique, a D2D technique, a B2B technique, and an M2M technique but are not limited thereto. That is, a transmission terminal and a reception terminal may share key related information by inserting key related information into a separate packet which does not directly relate to a call and transmitting the separate packet instead of a call packet transmitted through a direct communication channel. This separate packet may be a pilot packet transmitted before the call packet, e.g., a peer discovery packet, a synchronization packet, or a direct communication request packet.

As described above, by sharing key related information for secure communication between the first terminal 1810 and the second terminal 1830 by using a separate packet instead of a call packet, key information for secure communication may be generated without limitation of a bit size and transmitted, and thus security of the call packet transmitted and received through a direct communication link may be increase.

Figure 19A:
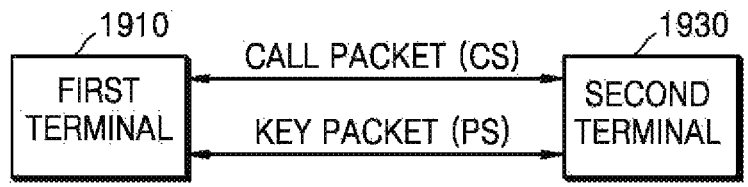
FIGS. 19A and 19B illustrate diagrams for describing the concept of a secure communication method according to another exemplary embodiment of the inventive concept.
Figure 19B:
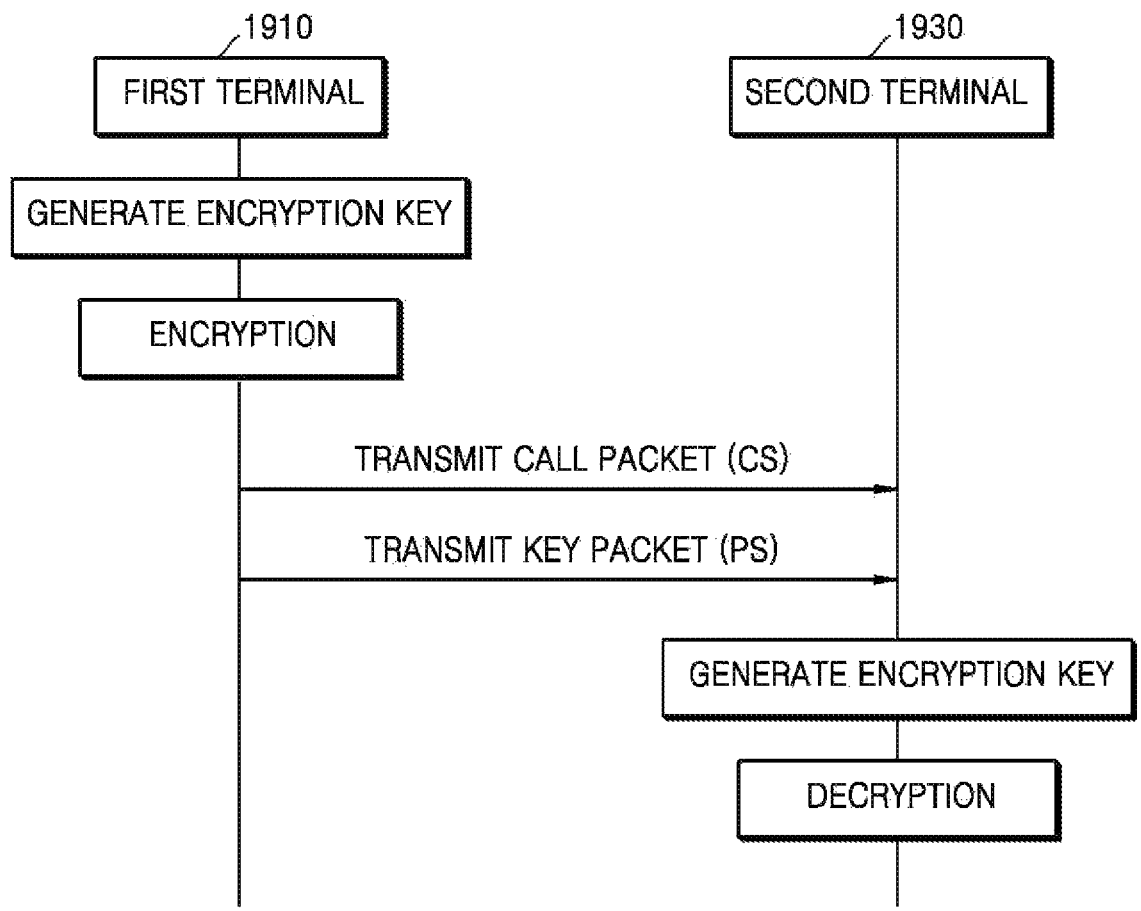

FIGS. 19A and 19B illustrate diagrams for describing the concept of a secure communication method according to another exemplary embodiment of the inventive concept. Both a first terminal 1910 and a second terminal 1930 illustrated in FIGS. 19A and 19B may be implemented using a secure communication terminal including the secure communication device of FIGS. 2 to 5 but are not limited thereto.

According to the secure communication method illustrated in FIGS. 19A and 19B, the first terminal 1910 separately forms a call packet including a bitstream and a key packet including encryption key information and transmits the call packet and the key packet to the second terminal 1930 through respective communication channels. For example, between the first terminal 1910 and the second terminal 1930, a voice network may be used for the call packet, and a data network may be used for the key packet. An example of the voice network may be a circuit switching network, and examples of the data network may be a packet switching network, an IP network, a Wi-Fi network, and an IMS network. In detail, when the first terminal 1910 and the second terminal 1930 use a CDMA scheme and an LTE scheme, respectively, the call packet may be transmitted through the circuit switching network, and the key packet may be transmitted through an LTE network.

If a media packet us used instead of the call packet, the media packet may be transmitted through a network optimized to each of media, and the key packet may be transmitted through a different network.

When a different wireless network is linked in a 3G communication system, a link structure may vary according to whether the different wireless network is reliable. A reliable network may be defined as a network guaranteeing network access security provided when a user accesses a service, network domain security in a wired section of wireless access networks, non-3G domain security within a non-3G access network, application domain security between the user and an inter-user application program, or user domain security performed inside a mobile terminal, or whether a network is reliable may be classified according to determination of network operators. Commonly, a wireless LAN such as a Wi-Fi network is classified into an unreliable network, and in a 3G communication system, reliability may be guaranteed by providing a server such as a packet data gateway (PDG) or an evolved PFG (ePDG) for an access to a wireless LAN when a packet is transmitted.

For synchronization between key packet transmission and call packet transmission through different communication channels, a general method may be used.

Figure 20A:
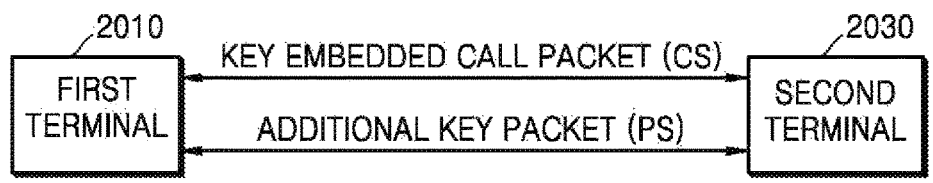
FIGS. 20A and 20B illustrate diagrams for describing the concept of a secure communication method according to another exemplary embodiment of the inventive concept.
Figure 20B:
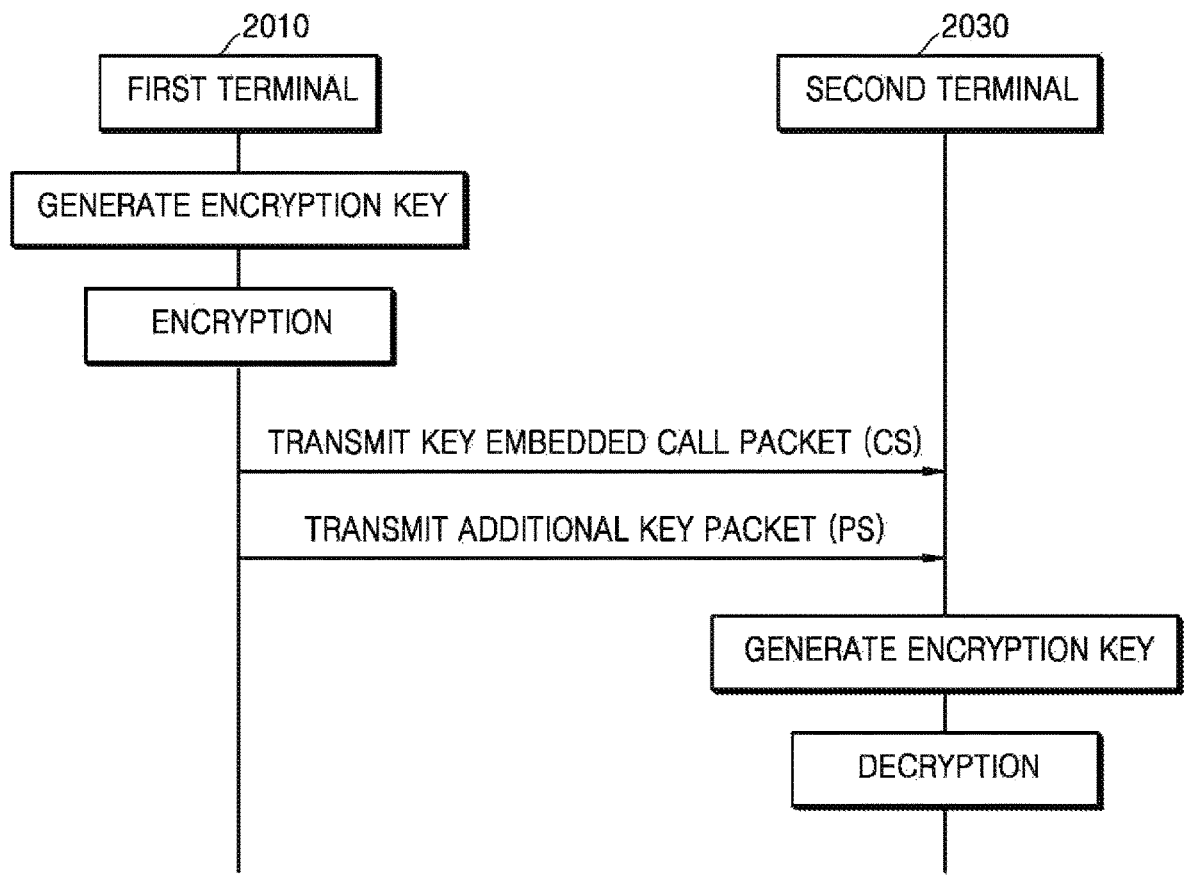

FIGS. 20A and 20B illustrate diagrams for describing the concept of a secure communication method according to another exemplary embodiment of the inventive concept. Both a first terminal 2010 and a second terminal 2030 illustrated in FIGS. 20A and 20B may be implemented using a secure communication terminal including the secure communication device of FIGS. 2 to 5 but are not limited thereto.

According to the secure communication method illustrated in FIGS. 20A and 20B, the first terminal 2010 embeds a portion of key information used for multi-encryption in a call packet including a bitstream, inserts the other portion of the key information into an additional key packet, and transmits the call packet and the additional key packet to the second terminal 2030 through different communication channels. The portion of the key information used for the multi-encryption may be embedded in an auxiliary region or a payload region of the bitstream.

Referring to FIGS. 20A and 20B, the first terminal 2010 may insert primary key information into the call packet, i.e., the bitstream and transmit the call packet to the second terminal 2030 through a voice network, and may transmit secondary key information to the second terminal 2030 through a network other than the voice network, e.g., a data network. As another example, the primary key information may be inserted into the call packet, i.e., the bitstream, and transmitted, whereas the secondary key information may be transmitted through a key packet other than the bitstream forming the call packet. Herein, the primary key information may be, for example, a first key used for encrypting the bitstream, and the secondary key information may be, for example, a second key used for encrypting the first key. As another example, at least two first keys used for encrypting the bitstream may be distributed and transmitted through different communication networks or through the call packet and a separate key packet. As described above, by distributing and transmitting a plurality of pieces of key information, security may be improved.

Figure 21:
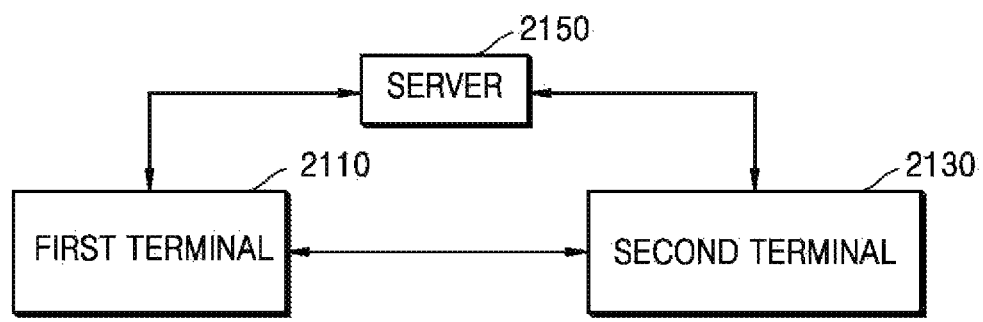
FIG. 21 illustrates a block diagram of a system for inter-terminal secure communication, according to an exemplary embodiment of the inventive concept.

FIG. 21 illustrates a block diagram of a system for inter-terminal secure communication, according to an exemplary embodiment of the inventive concept. Both a first terminal 2110 and a second terminal 2130 illustrated in FIG. 21 may be implemented using a secure communication terminal including the secure communication device of FIGS. 2 to 5 but are not limited thereto.

The secure communication system of FIG. 21 may include a server 2150 acting as a key distribution center. The server 2150 may perform authentication and key exchange. For the key exchange performed by the server 2150, an RSA encryption algorithm, a Diffie-Hellman algorithm, or a modified algorithm thereof may be used. In addition, the server 2150 may update a key to be used for secure communication between the first terminal 2110 and the second terminal 2130 in a predetermined unit. In addition, the server 2150 may check integrity of key related information by using a hash function such as SHA-2, SHA-3, or MD-5.

Referring to FIG. 21, when compatibility with the existing communication system is not mandatory, when it is necessary to additionally reinforce an encryption strength, or when interconnection with a communication provider is necessary, a secure communication service including the server 2150 may be provided.

In detail, when the first terminal 2110 performs encryption by using a plurality of pieces of key information, e.g., a basic key and a reinforcement key, the basic key may be generated by the first terminal 2110, while the reinforcement key may be generated by the server 2150 and transmitted to the first terminal 2110 and the second terminal 2130. Alternatively, the reinforcement key may be generated by the first terminal 2110, and the basic key may be generated by the server 2150. The first terminal 2110 may encrypt a partial region of a bitstream by using the basic key generated therein, configure a key embedded call packet by inserting the basic key into an encrypted bitstream, and transmit the key embedded call packet to the second terminal 2130. Alternatively, the first terminal 2110 may encrypt a partial region of a bitstream by using the basic key provided from the server 2150, configure a key embedded call packet by inserting the reinforcement key into an encrypted bitstream, and transmit the key embedded call packet to the second terminal 2130.

For dual encryption in which the first terminal 2110 encrypts a partial region of a bitstream by using a first key and encrypts the first key by using a second key, the first key may be generated by the first terminal 2110, while the second key may be generated by the server 2150 and transmitted to the first terminal 2110 and the second terminal 2130. Alternatively, the second key may be generated by the first terminal 2110, and the first key may be generated by the server 2150. The first terminal 2110 may encrypt a partial region of a bitstream by using the first key generated therein, encrypt the first key by using the second key provided from the server 2150, configure a key embedded call packet by inserting the encrypted first key into an encrypted bitstream, and transmit the key embedded call packet to the second terminal 2130.

A region in the key embedded call packet into which the key information is inserted may be a header region, a payload region, or an auxiliary region.

When the second terminal 2130 uses the basic key and the reinforcement key, the second terminal 2130 may generate a complete key by combining the basic key included in the key embedded call packet and the reinforcement key included in a key packet transmitted from the server 2150 or by combining the reinforcement key included in the key embedded call packet and the basic key included in the key packet transmitted from the server 2150 and use the generated complete key to decrypt the encrypted bitstream.

When the second terminal 2130 employs dual encryption based on the first key and the second key used to encrypt the first key, the second terminal 2130 may decrypt the encrypted first key included in the key embedded call packet by using the second key included in a key packet shared through the server 2150 and decrypt the encrypted bitstream by using the decrypted first key.

According to the exemplary embodiment described above, even when secure communication including the server 2150 is performed, user information or key related information stored or recorded in the server 2150 may be minimized, and it is difficult to decrypt an encrypted bitstream only with information leaked from the server 2150, and thus stability of secure communication may be guaranteed.

To guarantee higher stability of secure communication, it may be set to automatically delete user information or key related information used for inter-terminal secure communication, which is stored or recorded in the server 2150, when a predetermined time elapses or to grant an access right to the information and allow only an authorized person to access the information.

More various roles may be assigned to a server to provide a secure communication service. For example, a transmission terminal and a reception terminal belonging to a specific trust group may equip a trust chip, and the trust chip may generate a random key based on a predetermined encryption algorithm. The transmission terminal may encrypt a partial region of a bitstream by using a random key. The server may verify a packet including a bitstream encrypted by the transmission terminal belonging to the specific trust group and deliver the packet to the reception terminal belonging to the specific trust group. In this case, the server may control start or end of secure communication in real-time.

In addition, a secure communication service based on voice over internet protocol (VoIP) may be provided. When secure communication software is installed in a transmission terminal and a reception terminal belonging to a trust group, a unique personal key may be generated for each of the transmission terminal and the reception terminal, and a public key may be shared among terminals belonging to the trust group. Dual encryption may be performed using the personal key and the public key. For example, dual encryption may be performed using an RC4 256-bit key and an AES 256-bit key. A server may route an encrypted packet between the transmission terminal and the reception terminal or manage the secure communication software.

Figure 22:
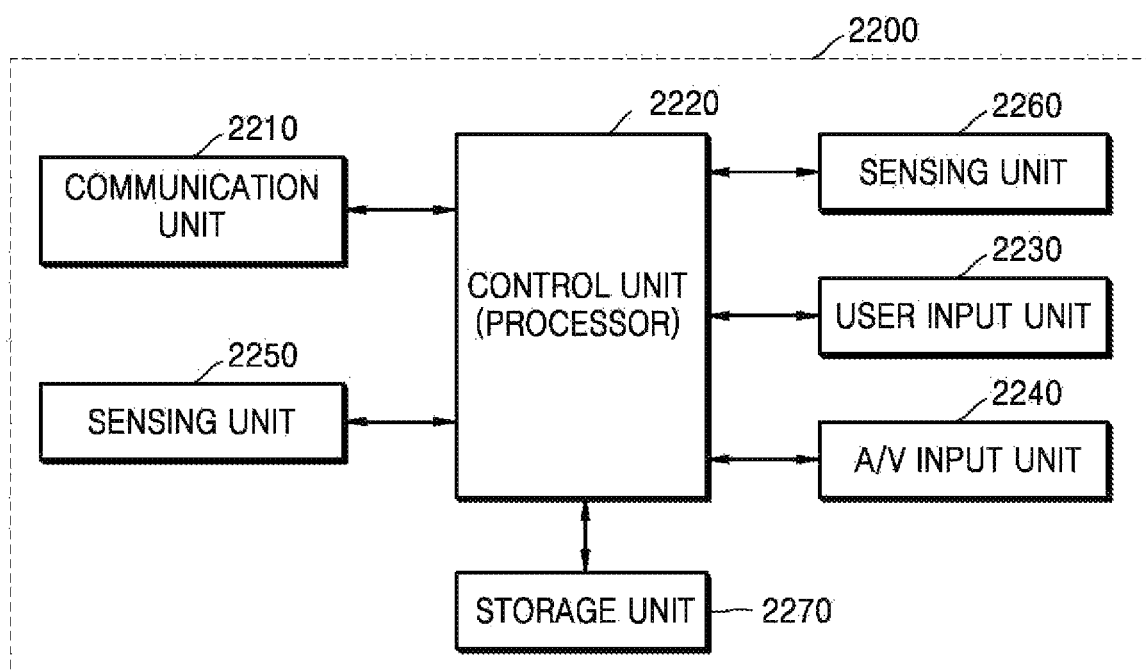
FIG. 22 illustrates a block diagram of a multimedia device having a secure communication function, according to an exemplary embodiment of the inventive concept.

FIG. 22 illustrates a block diagram of a multimedia device (terminal) 2200 having a secure communication function, according to an exemplary embodiment of the inventive concept.

The terminal 2200 of FIG. 22 may include a communication unit 2210, a control unit 2220, a user input unit 2230, an audio/video (A/V) input unit 2240, a sensing unit 2250, an output unit 2260, and a storage unit 2270. Herein, all the components are not mandatory. For example, the terminal 2200 may be implemented with the communication unit 2210 and the control unit 2220, or may include more than the components shown in FIG. 22. The control unit 2220 may be configured to include the functions of the security module 210 and the control module 250 of FIG. 2.

Referring to FIG. 22, the communication unit 2210 may include one or more components for performing communication between multimedia devices, i.e., between terminals, between a terminal and a server, or a terminal and an external network. For example, the communication unit 2210 may include at least one of a short distance communication module, a mobile communication module, and a broadcast reception module.

The short distance communication module may include a Bluetooth communication module, a Bluetooth low energy (BLE) communication module, a near-field wireless communication module (near-field communication (NFC)/radio frequency identification (RFID) module), a wireless local area network (WLAN) (Wi-Fi) communication module, a Zigbee communication module, an infrared data association (IrDA) communication module, Wi-Fi Direct (WFD) communication module, an ultra-wideband (UWB) communication module, an Ant+ communication module, and the like but is not limited thereto. The mobile communication module may transmit and receive a wireless signal to and from at least one of a base station, an external terminal, and a server in a mobile communication network. Herein the wireless signal may include a voice call signal, a video call signal, or various types of data according to text/multimedia message transmission and reception. The broadcast reception module may receive a broadcast signal and/or broadcast related information from the outside through a broadcast channel, and the broadcast channel may include a satellite channel and a terrestrial channel.

The communication unit 2210 may include a first communication module for transmitting and receiving a call packet through a circuit switched (CS) network and a second communication module for transmitting and receiving a key packet through a packet switched (PS) network. For example, the first communication module may be a 3G or 4G LTE communication module for communication through a high-speed network having high security and high mobility, and the second communication module may be a W-Fi communication module or a Bluetooth communication module.

Alternatively, the communication unit 2210 may include a first communication module for cellular communication and a second communication module for D2D direct communication. For example, the first communication module may be a 3G or 4G LTE communication module for communication through a high-speed network having high security and high mobility, and the second communication module may be a WFD communication module. The first communication module may broadcast a peer discovery packet for discovering a directly communicable terminal by using a cellular communication scheme. The second communication module may broadcast a peer discovery packet for discovering a directly communicable terminal by using a direct communication scheme, or may transmit a synchronization packet or a direct communication request packet after discovering the directly communicable terminal.

The control unit 2220 may commonly control a general operation of the terminal 2200. The control unit 2220 may generally control the communication unit 2210, the user input unit 2230, the A/V input unit 2240, the sensing unit 2250, the output unit 2260, and the like by executing programs stored in the storage unit 2270. The control unit 2220 may include a sensor hub of a seamless sensing platform (SSP). The sensor hub may be implemented by hardware, software, or a combination thereof. For example, the sensor hub may include a microcontroller unit (MCU). According to an exemplary embodiment, the sensor hub may be connected to the sensing unit 2250 and may collect sensing information from the sensing unit 2250. The control unit 2220 may perform the function of each of the components of FIG. 3 or 4.

The user input unit 2230 may indicate a means through which a user inputs data for controlling the terminal 2200. For example, the user input unit 2230 may include a keypad, a dome switch, a touch pad (a capacitive overlay touch pad, a resistive overlay touch pad, an IR beam touch pad, a surface acoustic wave touch pad, an integral strain gauge touch pad, or a piezoelectric touch pad), a jog wheel, a jog switch, and the like but is not limited thereto.

The A/V input unit 2240 is to input an audio signal or a video signal and may include a camera, a microphone, and the like. The camera may acquire an image frame of a still image, a moving picture, or the like through an image sensor in a video call mode or a capturing mode. An image captured through the image sensor may be processed by the control unit 2220 or a separate image processing unit (not shown). The image frame processed by the camera may be stored in the storage unit 2270 or transmitted to the outside through the communication unit 2210. Two or more cameras may be provided depending on an implementation form of the terminal 2200. The microphone may receive an external acoustic signal and process the external acoustic signal to electrical voice data. For example, the microphone may receive an acoustic signal from an external device or a speaker. The microphone may use various noise cancellation algorithms to cancel noise generated during a process of receiving an external acoustic signal.

The sensing unit 2250 may sense a state of the terminal 2200 or a state of the surroundings of the terminal 2200 and transmit the sensed information to the control unit 2220. The sensing unit 2250 may include at least one of a magnetic sensor, an acceleration sensor, a temperature/humidity sensor, an IR sensor, a gyroscope sensor, a position sensor (e.g., global positioning system (GPS)), an atmospheric pressure sensor, a proximity sensor, and an RGB sensor (illuminance sensor) but is not limited thereto. The function of each of the sensors may be intuitively inferred by those of ordinary skill in the art, and thus a detailed description thereof is omitted.

The output unit 2260 is to output an audio signal, a video signal, or a vibration signal and may include a display panel, a speaker, a vibration motor, and the like. The display panel displays information processed by the terminal 2200. For example, the display panel may display a UI or GUI related to a call in a normal call mode or display a connection (or discovery) failure notification on a screen when discovery of a directly communicable terminal fails. The display panel may display state information of a connection to a directly communicable terminal on the screen. When the display panel and the touch pad form a layer structure to configure a touch screen, the display panel may be used as not only an output device but also an input device. The display panel may include at least one of a liquid crystal display, a thin-film transistor liquid crystal display, an organic light-emitting diode, a flexible display, a three-dimensional (3D) display, and an electrophoretic display. The terminal 2200 may include two or more display panels according to an implementation form of the terminal 2200.

The speaker may output audio data received through the communication unit 2210 or stored in the storage unit 2270 or output an acoustic signal related to a function (e.g., a call signal reception sound, a message reception sound, or the like) performed by the terminal 2200. The vibration motor may output a vibration signal. For example, the vibration motor may output a vibration signal corresponding to an output of audio data or video data (e.g., a call signal reception sound, a message reception sound, or the like). In addition, the vibration motor may output a vibration signal when a touch is inputted through the touch screen.

The storage unit 2270 may store programs for processing and control of the control unit 2220 and store inputted/outputted data (communication connection information related to a second communication scheme and the like). The storage unit 2270 may include at least one type of storage medium among a flash memory type memory, a hard disk type memory, a multimedia card micro type memory, a card type memory (e.g., a secure digital (SD) or extreme digital (XD) memory or the like), random access memory (RAM), static RAM (SRAM), read only memory (ROM), electrically erasable programmable ROM (EEPROM), PROM, a magnetic memory, a magnetic disc, and an optical disc. In addition, the terminal 2200 may operate a web storage or a cloud server which performs a storage function of the storage unit 2270 over the Internet. The programs stored in the storage unit 2270 may be classified into a plurality of modules according to functions thereof, e.g., a UI module, a touch screen module, an alarm module, and the like.

The UI module may provide a specified UI, GUI, or the like cooperating with the terminal 2200 for each application. The touch screen module may sense a touch gesture of the user on the touch screen and transmit information regarding the touch gesture to the control unit 2320. According to an exemplary embodiment, the touch screen module may recognize and analyzes a touch code. The touch screen module may be configured by separate hardware including a controller. Various sensors for sensing a touch or a proximity touch on the touch screen may be provided inside or nearby the touch screen. An example of a sensor for sensing a touch on the touch screen is a tactile sensor. The tactile sensor is a sensor for sensing a contact of a specific object at a degree of human feeling or more. The tactile sensor may sense various pieces of information such as roughness of a contact surface, hardness of a contact object, a temperature of a contact point, and the like. Another example of a sensor for sensing a touch on the touch screen is a proximity sensor. The proximity sensor is a sensor for detecting whether an object approaching a predetermined detection surface or a nearby object exists by using an electromagnetic force or an IR ray without a mechanical contact. Examples of the proximity sensor are a transmissive optoelectric sensor, a direct reflective optoelectric sensor, a mirror reflective optoelectric sensor, high-frequency oscillation proximity sensor, a capacitive proximity sensor, a magnetic proximity sensor, an IR proximity sensor, and the like. examples of a touch gesture of the user are a tap, a touch & hold, a double tap, a drag, a panning, a flick, a drag & drop, a swipe, and the like. The storage unit 2270 may include a voice recognition module (not shown) for recognizing voice of the user by using a voice recognition engine and for transmitting the recognized voice to the control unit 2220.

The alarm module may generate a signal for notifying of the occurrence of an event of a secure communication module (not shown). Examples of an event generated by the secure communication module 2300 are call signal reception, message reception, a key signal input, a schedule notification, and the like. The alarm module may output an alarm signal in a video signal form through the display panel, an alarm signal in an audio signal form through the speaker, or an alarm signal in a vibration signal form through the vibration motor.

According to an exemplary embodiment, the multimedia device 2200 may additionally include a module related to secure communication or may be implemented to add a function related to secure communication to an existing component, e.g., the codec module.

In the embodiment described above, a target to be encrypted for secure communication may correspond to all types of media data forming a bitstream as media communicable between terminals, between a terminal and a server, and the terminal and a relay. For example, the media data may include at least one of video content, such as a photograph, an image, a video, or the like, audio content, such as voice, music, or the like, and messaging content, such as an email message, a short messaging service (SMS) or multimedia messaging service (MMS) message, a chat message, or the like, but is not limited thereto.

The exemplary embodiments described above are combined with the components and features of the inventive concept in predetermined forms. Each component or feature may be considered to be selective unless there is a separate clear description. Each component or feature may be carried out in a state not combined with another component or feature. In addition, an embodiment may be configured by combining some components and/or features. An order of operations described in the embodiments may be changed. Some components or features of a certain embodiment may be included in another embodiment or may be replaced by corresponding components or features of another embodiment. Accordingly, it would be obvious that an embodiment is configured by combining claims with no clear citation relationship in the claims or a new claim is included according to amendment after a filing date.

The above-described embodiments may be implemented by various means, e.g., hardware, firmware, software, or a combination thereof. For implementation by hardware, the embodiments may be implemented by one or more of application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, and the like.

For implementation by firmware or software, the embodiments may be edited as computer-executable programs by using forms such as modules, procedures, functions, and the like for performing the functions or operations described above and may be implemented in a general-use digital computer for operating the programs by using a computer-readable recording medium. In addition, a data structure, program instructions, or a data file usable in the above-described embodiments may be recorded in a computer-readable recording medium through various means. The computer-readable recording medium is any data storage device that stores data that can thereafter be read by a computer system and may be located inside or outside a processor. Examples of the computer-readable recording medium include hardware devices specifically configured to store and execute program instructions, such as magnetic media, optical media, magneto-optical media, ROM, random-access memory (RAM), a flash memory, and the like. The computer-readable recording medium may also be a transmission medium for transmitting a signal designating program instructions, a data structure, or the like. Examples of the program instructions may include not only mechanical language codes generated by a compiler but also high-level language codes executable by a computer using an interpreter or the like. In addition, the inventive concept may adopt the prior art for electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

Specific executions described in the inventive concept are exemplary embodiments and do not limit the scope of the inventive concept even in any method. For conciseness of the specification, disclosure of conventional electronic configurations, control systems, software, and other functional aspects of the systems may be omitted. In addition, connections or connection members of lines between components shown in the drawings illustrate functional connections and/or physical or circuit connections, and the connections or connection members can be represented by replaceable or additional various functional connections, physical connections, or circuit connections in an actual apparatus.

The use of the term "said" or a similar directional term in the specification (in particular, in claims) of the inventive concept may correspond to both the singular and the plural. In addition, when a range is disclosed in the inventive concept, inventions to which individual values belonging to the range are applied are included (if there is no disclosure opposed to this), and this is the same as if each of the individual values forming the range is disclosed in the detailed description of the inventive concept. Finally, for steps forming the methods according to the inventive concept, if an order is not clearly disclosed or, if there is no disclosure opposed to the clear order, the steps can be performed in any order deemed proper. The inventive concept is not necessarily limited to the disclosed order of the steps. The use of all illustrations or illustrative terms (for example, and so forth, etc.) in the inventive concept is simply to describe the inventive concept in detail, and the scope of the inventive concept is not limited due to the illustrations or illustrative terms unless they are limited by claims. In addition, it will be understood by those of ordinary skill in the art that various modifications, combinations, and changes can be formed according to design conditions and factors within the scope of the attached claims or the equivalents.

The invention claimed is:

1. A secure communication apparatus comprising:
at least one processor configured to control the secure communication apparatus to:
generate an output bitstream comprising first key information including an encryption key, a first encryption flag and encrypted first data which is generated by encrypting the first data using the encryption key of the first key information, by inserting the first key information and the first encryption flag into the output bitstream, wherein the first encryption flag indicates whether the first data is encrypted; and
transmit the output bitstream including the first key information including the encryption key, the first encryption flag and the encrypted first data to a counterpart terminal,
wherein the encryption key is fragmented and included in the output bitstream together with fragmentation information of the encryption key.

2. The secure communication apparatus of claim 1, wherein the at least one processor is further configured to control the secure communication apparatus to encrypt a payload region of the output bitstream.

3. The secure communication apparatus of claim 1, wherein the at least one processor is further configured to control the secure communication apparatus to insert the first key information into at least one of an auxiliary region and a payload region of the output bitstream.

4. The secure communication apparatus of claim 1, wherein the at least one processor is further configured to control the secure communication apparatus to perform the encryption during encoding or after completing the encoding.

5. The secure communication apparatus of claim 1, wherein the first key information includes an index of the encryption key, or a pointer value of the encryption key.

6. The secure communication apparatus of claim 1, wherein the first key information is updated and transmitted in a predetermined period.

7. A secure communication method comprising:
generating, by a first terminal, a first key to be used for decryption in a second terminal;
encrypting, by the first terminal using the first key, a first bitstream;
generating, by the first terminal, an output bitstream comprising the encrypted first bitstream which is encrypted by the first key, the first key and a first encryption flag indicating whether first data of the first bitstream is encrypted; and
transmitting, by the first terminal, the output bitstream including the first key, the first encryption flag and the encrypted first bitstream to the second terminal,
wherein the first key is fragmented and included in the output bitstream together with fragmentation information of the first key.

8. The secure communication method of claim 7, wherein the first key is transmitted to the second terminal through an auxiliary region of the first bitstream.

9. The secure communication method of claim 7, wherein the first bitstream is a payload region of the output bitstream encrypted using the first key.

10. The secure communication method of claim 7, wherein the first key is updated every predetermined period and transmitted to the second terminal.

11. A multimedia device having a secure communication function, the multimedia device comprising:
a processor configured to:
generate a first encryption key to be transmitted to a counterpart terminal;
encrypt a first bitstream by using the first encryption key;

generate an output bitstream comprising the encrypted first bitstream which is encrypted by the first encryption key, the first encryption key and a first encryption flag indicating whether first data of the first bitstream is encrypted;

control the multimedia device to transmit, to the counterpart terminal, the output bitstream in which the first encryption key, the first encryption flag and the encrypted first bitstream are embedded;

control the multimedia device to receive, from the counterpart terminal, an input bitstream comprising a second encryption key, a second encryption flag and a region encrypted using the second encryption key by the counterpart terminal;

identify the second encryption key based on the second encryption flag; and decrypt the region encrypted using the second encryption key using the second encryption key, wherein the first encryption key is fragmented and included in the output bitstream together with fragmentation information of the first encryption key.

12. The multimedia device of claim 11, wherein the first encryption key is embedded in an auxiliary region of the output bitstream and transmitted to the counterpart terminal.

13. The multimedia device of claim 11, wherein the first bitstream is a payload region of the output bitstream encrypted using the first encryption key.

14. The multimedia device of claim 11, wherein the first encryption key is updated every predetermined period and transmitted to the counterpart terminal.

15. The secure communication apparatus of claim 1, wherein the first encryption flag indicates location information of an encrypted region of the output bitstream.

16. The secure communication apparatus of claim 15, wherein the first encryption flag indicates a number of encrypted frames, and wherein the first key information is periodically updated based on the number of encrypted frames.

17. The secure communication apparatus of claim 15, wherein the first encryption flag indicates a synchronization bit.

18. The secure communication apparatus of claim 15, wherein the first encryption flag indicates a first synchronization bit indicating a start location of the encrypted region and a second synchronization bit indicating an end location of the encrypted region.

19. The secure communication apparatus of claim 1, wherein the at least one processor is further configured to control the secure communication apparatus to:

receive an input bitstream comprising second key information, a second encryption flag and encrypted second data;

identify the second key information based on the second encryption flag; and decrypt the encrypted second data using the second key information.

* * * * *